(12) United States Patent
Mackrell et al.

(10) Patent No.: US 8,965,798 B1
(45) Date of Patent: Feb. 24, 2015

(54) REQUESTING REIMBURSEMENT FOR TRANSACTIONS

(75) Inventors: Bryan L. Mackrell, Cranberry Township, PA (US); Michael Scott Ley, Moon Township, PA (US); Christine Johns, Allison Park, PA (US); Jennifer Marie Levin, Chicago, IL (US); Marieke Smets, Chicago, IL (US); Chui-Ling Michelle Moy, Chicago, IL (US); David Wisely Vondle, Chicago, IL (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 889 days.

(21) Appl. No.: 12/696,647

(22) Filed: Jan. 29, 2010

Related U.S. Application Data

(60) Provisional application No. 61/148,802, filed on Jan. 30, 2009.

(51) Int. Cl.
*G07B 17/00* (2006.01)
*G06Q 40/00* (2012.01)

(52) U.S. Cl.
USPC .................................. 705/30; 705/39; 705/41

(58) Field of Classification Search
USPC ........................................................... 705/30
See application file for complete search history.

(56) References Cited

U.S. PATENT DOCUMENTS

| | | |
|---|---|---|
| 4,367,402 A | 1/1983 | Giraud et al. |
| 4,443,027 A | 4/1984 | McNeely et al. |
| 4,648,037 A | 3/1987 | Valentino |
| 4,837,422 A | 6/1989 | Dethloff et al. |
| 5,101,200 A | 3/1992 | Swett |
| 5,500,513 A | 3/1996 | Langhans et al. |
| 5,621,640 A | 4/1997 | Burke |
| 5,649,118 A | 7/1997 | Carlisle et al. |
| 5,845,260 A | 12/1998 | Nakano et al. |
| 5,918,217 A | 6/1999 | Maggioncalda et al. |

(Continued)

FOREIGN PATENT DOCUMENTS

| | | |
|---|---|---|
| WO | WO 96/34358 A1 | 10/1996 |
| WO | WO 03/030054 A1 | 4/2003 |

OTHER PUBLICATIONS

U.S. Appl. No. 12/152,028, filed May 12, 2008.

(Continued)

*Primary Examiner* — Matthew Gart
*Assistant Examiner* — Ashford S Hayles
(74) *Attorney, Agent, or Firm* — Buchanan Ingersoll & Rooney PC; Robert J. Pugh

(57) ABSTRACT

Various embodiments are directed to systems and methods for generating and delivering a reimbursement request from a customer of a financial institution. According to various embodiments a transaction list may be displayed to a customer. The transaction list may comprise transactions on the customer's account at the financial institution. An indication of a transaction to be reimbursed selected from the list, an indication of a recipient of the reimbursement request, an indication of the reimbursement request amount, and a text message may be received from the customer. The reimbursement request may be generated by packaging an indication of the customer, a description of the transaction to be reimbursed, the indication of the recipient, the indication of the reimbursement request amount and the text message into a message format. The reimbursement request may be transmitted to the recipient.

20 Claims, 13 Drawing Sheets

(56) References Cited

U.S. PATENT DOCUMENTS

| | | | |
|---|---|---|---|
| 5,953,710 A | 9/1999 | Fleming |
| 5,963,925 A | 10/1999 | Kolling et al. |
| 5,991,749 A | 11/1999 | Morrill, Jr. |
| 6,012,044 A | 1/2000 | Maggioncalda et al. |
| 6,032,134 A | 2/2000 | Weissman |
| 6,044,360 A | 3/2000 | Picciallo |
| 6,049,776 A | 4/2000 | Donnelly et al. |
| 6,052,675 A | 4/2000 | Checchio |
| 6,064,984 A | 5/2000 | Ferguson et al. |
| 6,064,986 A | 5/2000 | Edelman |
| 6,085,174 A | 7/2000 | Edelman |
| 6,088,682 A | 7/2000 | Burke |
| 6,112,191 A | 8/2000 | Burke |
| 6,128,603 A | 10/2000 | Dent et al. |
| 6,173,269 B1 | 1/2001 | Solokl et al. |
| 6,332,154 B2 | 12/2001 | Beck et al. |
| 6,353,811 B1 | 3/2002 | Weissman |
| 6,401,079 B1 | 6/2002 | Kahn et al. |
| 6,411,938 B1 | 6/2002 | Gates et al. |
| 6,473,794 B1 | 10/2002 | Guheen et al. |
| 6,493,685 B1 | 12/2002 | Ensel et al. |
| 6,519,571 B1 | 2/2003 | Guheen et al. |
| 6,601,233 B1 | 7/2003 | Underwood |
| 6,609,110 B1 | 8/2003 | Dowd et al. |
| 6,633,878 B1 | 10/2003 | Underwood |
| 6,636,242 B2 | 10/2003 | Bowman-Amuah |
| 6,636,833 B1 | 10/2003 | Flitcroft et al. |
| 6,684,190 B1 | 1/2004 | Powers et al. |
| 6,718,314 B2 | 4/2004 | Chaum et al. |
| 6,718,535 B1 | 4/2004 | Underwood |
| 6,742,002 B2 | 5/2004 | Arrowood |
| 6,742,704 B2 | 6/2004 | Fitzmaurice et al. |
| 6,839,687 B1 | 1/2005 | Dent et al. |
| 6,839,692 B2 | 1/2005 | Carrott et al. |
| 6,876,971 B1 | 4/2005 | Burke |
| 6,921,268 B2 | 7/2005 | Bruno et al. |
| 6,993,510 B2 | 1/2006 | Guy et al. |
| 7,024,390 B1 | 4/2006 | Mori et al. |
| 7,031,939 B1 | 4/2006 | Gallagher et al. |
| 7,039,440 B2 | 5/2006 | Rodriguez et al. |
| 7,062,458 B2 | 6/2006 | Maggioncalda et al. |
| 7,076,465 B1 | 7/2006 | Blagg et al. |
| 7,100,195 B1 | 8/2006 | Underwood |
| 7,110,979 B2 | 9/2006 | Tree |
| 7,143,064 B2 | 11/2006 | Picciallo et al. |
| 7,146,338 B2 | 12/2006 | Kight et al. |
| 7,147,149 B2 | 12/2006 | Giraldin et al. |
| 7,165,041 B1 | 1/2007 | Guheen et al. |
| 7,171,370 B2 | 1/2007 | Burke |
| 7,175,073 B2 | 2/2007 | Kelley et al. |
| 7,184,979 B1 | 2/2007 | Carson |
| 7,248,855 B2 | 7/2007 | Joyce et al. |
| 7,249,092 B2 | 7/2007 | Dunn et al. |
| 7,249,097 B2 | 7/2007 | Hutchison et al. |
| 7,263,507 B1 | 8/2007 | Brake, Jr. et al. |
| 7,264,153 B1 | 9/2007 | Burke |
| 7,319,986 B2 | 1/2008 | Praisner et al. |
| 7,328,839 B2 | 2/2008 | Keohane et al. |
| 7,346,528 B2 | 3/2008 | Thengvall et al. |
| 7,376,569 B2 | 5/2008 | Plunkett et al. |
| 7,379,887 B2 | 5/2008 | Pachon et al. |
| 7,380,707 B1 * | 6/2008 | Fredman ................ 235/379 |
| 7,382,773 B2 | 6/2008 | Schoeneberger et al. |
| 7,401,731 B1 | 7/2008 | Pietz et al. |
| 7,464,859 B1 * | 12/2008 | Hawkins ................ 235/379 |
| 7,502,758 B2 | 3/2009 | Burke |
| 7,536,349 B1 * | 5/2009 | Mik et al. ................ 705/39 |
| 7,536,351 B2 | 5/2009 | Leblang et al. |
| 7,571,849 B2 | 8/2009 | Burke |
| 7,577,665 B2 | 8/2009 | Ramer et al. |
| 7,580,881 B2 | 8/2009 | Singer et al. |
| 7,620,573 B2 | 11/2009 | Jameson |
| 7,627,512 B2 | 12/2009 | Harris et al. |
| 7,647,322 B2 | 1/2010 | Thomsen |
| 7,660,581 B2 | 2/2010 | Ramer et al. |
| 7,668,768 B2 | 2/2010 | Oikonomidis |
| 7,672,861 B2 | 3/2010 | Al-Otaibi et al. |
| 7,685,083 B2 | 3/2010 | Fairweather |
| 7,707,052 B2 | 4/2010 | Kuhn et al. |
| 7,711,619 B2 | 5/2010 | Merton et al. |
| 7,716,217 B2 | 5/2010 | Marston et al. |
| 7,729,959 B1 | 6/2010 | Wells et al. |
| 7,752,123 B2 | 7/2010 | Brookfield et al. |
| 7,774,257 B2 | 8/2010 | Maggioncalda et al. |
| 7,783,564 B2 | 8/2010 | Mullen et al. |
| 7,788,146 B2 | 8/2010 | McCarthy, Jr. |
| 7,792,748 B1 | 9/2010 | Ebersole et al. |
| 7,797,181 B2 | 9/2010 | Vianello |
| 7,797,218 B2 | 9/2010 | Rosen et al. |
| 7,797,226 B2 | 9/2010 | Ram et al. |
| 7,801,814 B2 | 9/2010 | Cataline et al. |
| 7,809,616 B1 * | 10/2010 | Orttung et al. ................ 705/34 |
| 7,809,641 B2 | 10/2010 | Sanders et al. |
| 7,813,978 B2 * | 10/2010 | Abbott et al. ................ 705/35 |
| 7,818,233 B1 | 10/2010 | Sloan et al. |
| 7,827,102 B2 | 11/2010 | Saliba et al. |
| 7,831,494 B2 | 11/2010 | Sloan et al. |
| 7,835,972 B2 | 11/2010 | Almeida et al. |
| 7,844,492 B2 | 11/2010 | Perkowski et al. |
| 7,848,948 B2 | 12/2010 | Perkowski et al. |
| 7,860,871 B2 | 12/2010 | Ramer et al. |
| 7,865,187 B2 | 1/2011 | Ramer et al. |
| 7,912,790 B2 | 3/2011 | Albertsson |
| 7,962,419 B2 * | 6/2011 | Gupta et al. ................ 705/67 |
| 8,015,090 B1 | 9/2011 | Borzych et al. |
| 8,065,230 B1 | 11/2011 | Little |
| 8,086,558 B2 | 12/2011 | Dewar |
| 8,099,350 B2 | 1/2012 | Ryder |
| 8,204,809 B1 * | 6/2012 | Wise ................ 705/35 |
| 2001/0047310 A1 | 11/2001 | Russell |
| 2002/0002479 A1 | 1/2002 | Almog et al. |
| 2002/0007330 A1 | 1/2002 | Kumar et al. |
| 2002/0026412 A1 | 2/2002 | Kabin |
| 2002/0046074 A1 | 4/2002 | Barton |
| 2002/0052773 A1 | 5/2002 | Kraemer et al. |
| 2002/0055870 A1 | 5/2002 | Thomas |
| 2002/0077955 A1 | 6/2002 | Ramm |
| 2002/0095363 A1 | 7/2002 | Sloan et al. |
| 2002/0099635 A1 | 7/2002 | Guiragosian |
| 2002/0103805 A1 | 8/2002 | Canner et al. |
| 2002/0120568 A1 * | 8/2002 | Leblang et al. ................ 705/40 |
| 2002/0123949 A1 | 9/2002 | VanLeeuwen |
| 2002/0133368 A1 | 9/2002 | Strutt et al. |
| 2002/0147672 A1 | 10/2002 | Gaini |
| 2002/0152158 A1 | 10/2002 | Paleiov et al. |
| 2002/0188536 A1 | 12/2002 | Milosavljevic et al. |
| 2003/0009411 A1 | 1/2003 | Ram et al. |
| 2003/0033226 A1 | 2/2003 | Anderson |
| 2003/0050889 A1 | 3/2003 | Burke |
| 2003/0055758 A1 | 3/2003 | Sidhu et al. |
| 2003/0083930 A1 | 5/2003 | Burke |
| 2003/0135634 A1 | 7/2003 | Moeller et al. |
| 2003/0177027 A1 | 9/2003 | Dimarco |
| 2003/0216957 A1 | 11/2003 | Florence et al. |
| 2003/0221118 A1 | 11/2003 | Walker |
| 2004/0012588 A1 | 1/2004 | Lulis |
| 2004/0019543 A1 | 1/2004 | Blagg et al. |
| 2004/0044632 A1 * | 3/2004 | Onn et al. ................ 705/67 |
| 2004/0054610 A1 | 3/2004 | Amstutz et al. |
| 2004/0068432 A1 | 4/2004 | Meyerkopf et al. |
| 2004/0088177 A1 | 5/2004 | Travis et al. |
| 2004/0107112 A1 | 6/2004 | Cotter |
| 2004/0117202 A1 | 6/2004 | Winklevoss et al. |
| 2004/0148234 A1 * | 7/2004 | Gonen-Friedman et al. ... 705/30 |
| 2004/0148252 A1 * | 7/2004 | Fleishman ................ 705/39 |
| 2004/0158513 A1 | 8/2004 | Musacchio |
| 2004/0172279 A1 * | 9/2004 | Carolan et al. ................ 705/1 |
| 2004/0186852 A1 | 9/2004 | Rosen |
| 2004/0192351 A1 | 9/2004 | Duncan |
| 2004/0215560 A1 * | 10/2004 | Amalraj et al. ................ 705/40 |
| 2004/0254805 A1 | 12/2004 | Schwerin-Wenzel et al. |
| 2004/0267559 A1 * | 12/2004 | Hinderer et al. ................ 705/1 |
| 2005/0026119 A1 | 2/2005 | Ellis et al. |
| 2005/0027632 A1 | 2/2005 | Zeitoun et al. |

(56) References Cited

U.S. PATENT DOCUMENTS

| | | | |
|---|---|---|---|
| 2005/0051617 A1* | 3/2005 | Gorelick | 235/379 |
| 2005/0060228 A1* | 3/2005 | Woo | 705/14 |
| 2005/0060318 A1 | 3/2005 | Brickman | |
| 2005/0080691 A1 | 4/2005 | Holm-Blagg | |
| 2005/0086075 A1 | 4/2005 | Kaehler et al. | |
| 2005/0125340 A1* | 6/2005 | Lin et al. | 705/39 |
| 2005/0131813 A1* | 6/2005 | Gallagher et al. | 705/39 |
| 2005/0154662 A1 | 7/2005 | Langenwalter | |
| 2005/0164151 A1 | 7/2005 | Klein | |
| 2005/0187804 A1 | 8/2005 | Clancy et al. | |
| 2005/0240431 A1 | 10/2005 | Cotter | |
| 2005/0282126 A1 | 12/2005 | Pesso | |
| 2006/0064378 A1 | 3/2006 | Clementz et al. | |
| 2006/0069635 A1 | 3/2006 | Ram et al. | |
| 2006/0080126 A1* | 4/2006 | Greer et al. | 705/1 |
| 2006/0095331 A1 | 5/2006 | O'Malley et al. | |
| 2006/0100919 A1 | 5/2006 | Levine | |
| 2006/0122922 A1* | 6/2006 | Lowenthal | 705/35 |
| 2006/0122923 A1 | 6/2006 | Burke | |
| 2006/0149609 A1 | 7/2006 | Stenerson et al. | |
| 2006/0163341 A1 | 7/2006 | Tulluri et al. | |
| 2006/0178971 A1 | 8/2006 | Owen et al. | |
| 2006/0212318 A1* | 9/2006 | Dooley et al. | 705/4 |
| 2006/0224478 A1 | 10/2006 | Harbison et al. | |
| 2006/0235777 A1 | 10/2006 | Takata | |
| 2006/0242084 A1 | 10/2006 | Moses | |
| 2006/0277091 A1 | 12/2006 | Kochikar et al. | |
| 2006/0277128 A1 | 12/2006 | Anandarao et al. | |
| 2006/0282353 A1 | 12/2006 | Gikandi | |
| 2006/0282369 A1 | 12/2006 | White | |
| 2006/0282381 A1* | 12/2006 | Ritchie | 705/42 |
| 2007/0005477 A1 | 1/2007 | McAtamney | |
| 2007/0005524 A1 | 1/2007 | Iwachin | |
| 2007/0034688 A1 | 2/2007 | Burke | |
| 2007/0038545 A1 | 2/2007 | Smith et al. | |
| 2007/0038610 A1 | 2/2007 | Omoigui | |
| 2007/0055549 A1 | 3/2007 | Moore et al. | |
| 2007/0055602 A1 | 3/2007 | Mohn | |
| 2007/0060109 A1 | 3/2007 | Ramer et al. | |
| 2007/0060173 A1 | 3/2007 | Ramer et al. | |
| 2007/0061252 A1 | 3/2007 | Burke | |
| 2007/0061257 A1 | 3/2007 | Neofytides et al. | |
| 2007/0061258 A1* | 3/2007 | Neofytides et al. | 705/40 |
| 2007/0061333 A1 | 3/2007 | Ramer et al. | |
| 2007/0083465 A1 | 4/2007 | Ciurea et al. | |
| 2007/0094130 A1 | 4/2007 | Burke | |
| 2007/0100749 A1* | 5/2007 | Bachu et al. | 705/42 |
| 2007/0112662 A1 | 5/2007 | Kumar | |
| 2007/0156519 A1 | 7/2007 | Agassi et al. | |
| 2007/0162301 A1 | 7/2007 | Sussman et al. | |
| 2007/0162387 A1 | 7/2007 | Cataline et al. | |
| 2007/0179841 A1 | 8/2007 | Agassi et al. | |
| 2007/0185721 A1 | 8/2007 | Agassi et al. | |
| 2007/0192318 A1 | 8/2007 | Ramer et al. | |
| 2007/0208588 A1 | 9/2007 | Rhoades et al. | |
| 2007/0208624 A1 | 9/2007 | Gallagher | |
| 2007/0214162 A1 | 9/2007 | Rice | |
| 2007/0231777 A1 | 10/2007 | Dimarco | |
| 2007/0241120 A1 | 10/2007 | Henry | |
| 2007/0255662 A1* | 11/2007 | Tumminaro | 705/79 |
| 2007/0255965 A1 | 11/2007 | McGucken | |
| 2007/0298392 A1 | 12/2007 | Mitchell | |
| 2008/0010194 A1* | 1/2008 | Thomas | 705/39 |
| 2008/0015970 A1 | 1/2008 | Brookfield et al. | |
| 2008/0015988 A1 | 1/2008 | Brown et al. | |
| 2008/0040845 A1 | 2/2008 | Shoshan | |
| 2008/0046347 A1* | 2/2008 | Smith et al. | 705/30 |
| 2008/0060241 A1 | 3/2008 | Molinaro | |
| 2008/0120129 A1 | 5/2008 | Seubert et al. | |
| 2008/0133393 A1 | 6/2008 | Arnold et al. | |
| 2008/0140559 A1 | 6/2008 | Ram et al. | |
| 2008/0183545 A1 | 7/2008 | Deitrich et al. | |
| 2008/0195512 A1 | 8/2008 | Klebanoff et al. | |
| 2008/0195556 A1 | 8/2008 | Vioni | |
| 2008/0201208 A1 | 8/2008 | Tie et al. | |
| 2008/0208638 A1* | 8/2008 | Davidson et al. | 705/4 |
| 2008/0243716 A1 | 10/2008 | Ouimet et al. | |
| 2008/0249936 A1* | 10/2008 | Miller et al. | 705/40 |
| 2008/0319781 A1 | 12/2008 | Stivoric et al. | |
| 2009/0006418 A1 | 1/2009 | O'Malley | |
| 2009/0063353 A1 | 3/2009 | Viidu et al. | |
| 2009/0092241 A1 | 4/2009 | Minert et al. | |
| 2009/0094155 A1* | 4/2009 | Baig et al. | 705/40 |
| 2009/0094170 A1 | 4/2009 | Mohn | |
| 2009/0112674 A1 | 4/2009 | Musso et al. | |
| 2009/0119013 A1 | 5/2009 | O'Malley | |
| 2009/0132313 A1 | 5/2009 | Chandler et al. | |
| 2009/0138341 A1 | 5/2009 | Mohan et al. | |
| 2009/0177688 A1 | 7/2009 | Karlsen et al. | |
| 2009/0182664 A1 | 7/2009 | Trombley | |
| 2009/0192874 A1 | 7/2009 | Powles et al. | |
| 2009/0204448 A1 | 8/2009 | Kaehler et al. | |
| 2009/0204455 A1 | 8/2009 | Rubin | |
| 2009/0204538 A1 | 8/2009 | Ley et al. | |
| 2009/0216641 A1 | 8/2009 | Hubbard | |
| 2009/0228381 A1* | 9/2009 | Mik et al. | 705/34 |
| 2009/0234697 A1 | 9/2009 | Taguchi | |
| 2009/0254469 A1 | 10/2009 | Robertson | |
| 2009/0276231 A1 | 11/2009 | Bazigos et al. | |
| 2009/0276258 A1 | 11/2009 | Dane | |
| 2009/0292648 A1 | 11/2009 | Damschroder et al. | |
| 2009/0319289 A1 | 12/2009 | Pande | |
| 2009/0319344 A1 | 12/2009 | Tepper et al. | |
| 2009/0327051 A1 | 12/2009 | Nerby | |
| 2009/0327106 A1 | 12/2009 | Bartelt et al. | |
| 2010/0023385 A1 | 1/2010 | Galvan | |
| 2010/0030671 A1 | 2/2010 | Gelerman | |
| 2010/0063981 A1 | 3/2010 | Thomsen | |
| 2010/0070323 A1 | 3/2010 | Polcari et al. | |
| 2010/0070448 A1 | 3/2010 | Omoigui | |
| 2010/0082481 A1* | 4/2010 | Lin et al. | 705/41 |
| 2010/0100424 A1 | 4/2010 | Buchanan et al. | |
| 2010/0100427 A1 | 4/2010 | McKeown et al. | |
| 2010/0100464 A1 | 4/2010 | Ellis et al. | |
| 2010/0100469 A1 | 4/2010 | Buchanan et al. | |
| 2010/0100470 A1 | 4/2010 | Buchanan et al. | |
| 2010/0100561 A1 | 4/2010 | Cooper et al. | |
| 2010/0106566 A1 | 4/2010 | Al-Otaibi et al. | |
| 2010/0114672 A1 | 5/2010 | Klaus et al. | |
| 2010/0121745 A1* | 5/2010 | Teckchandani et al. | 705/30 |
| 2010/0125475 A1 | 5/2010 | Twyman | |
| 2010/0131306 A1 | 5/2010 | Koo et al. | |
| 2010/0145861 A1* | 6/2010 | Law et al. | 705/76 |
| 2010/0145876 A1 | 6/2010 | Pessin | |
| 2010/0153211 A1 | 6/2010 | Ramer et al. | |
| 2010/0179916 A1 | 7/2010 | Johns et al. | |
| 2010/0180029 A1 | 7/2010 | Fourman | |
| 2010/0191629 A1* | 7/2010 | Olliphant | 705/30 |
| 2010/0198863 A1 | 8/2010 | Lee et al. | |
| 2010/0217652 A1 | 8/2010 | Brooks Rix | |
| 2010/0235299 A1 | 9/2010 | Considine | |
| 2010/0241534 A1* | 9/2010 | Tingley-Hock | 705/30 |
| 2010/0287086 A1 | 11/2010 | Harris et al. | |
| 2010/0299277 A1 | 11/2010 | Emelo et al. | |
| 2010/0306017 A1 | 12/2010 | Dreyfuss et al. | |
| 2010/0312713 A1 | 12/2010 | Keltner | |
| 2010/0312718 A1 | 12/2010 | Rosenthal et al. | |
| 2010/0332379 A1 | 12/2010 | Ram et al. | |
| 2011/0173118 A1* | 7/2011 | Hu | 705/39 |
| 2011/0238441 A1* | 9/2011 | Callas | 705/2 |
| 2011/0276494 A1* | 11/2011 | Hutchison et al. | 705/67 |
| 2011/0282803 A1 | 11/2011 | Woods et al. | |

OTHER PUBLICATIONS

U.S. Appl. No. 12/152,074, filed May 12, 2008.
U.S. Appl. No. 12/120,995, filed May 15, 2008.
U.S. Appl. No. 12/479,378, filed Jun. 5, 2009.
U.S. Appl. No. 12/696,959, filed Jan. 29, 2010.
U.S. Appl. No. 12/696,968, filed Jan. 29, 2010.
U.S. Appl. No. 13/355,056, filed Jan. 20, 2012.
U.S. Appl. No. 12/803,705, filed Jul. 2, 2010.
U.S. Appl. No. 13/037,063, filed Feb. 28, 2011.
U.S. Appl. No. 13/037,072, filed Feb. 28, 2011.

(56) References Cited

OTHER PUBLICATIONS

U.S. Appl. No. 13/037,096, filed Feb. 28, 2011.
U.S. Appl. No. 12/803,707, filed Jul. 2, 2010.
U.S. Appl. No. 12/803,706, filed Jul. 2, 2010.
U.S. Appl. No. 12/754,967, filed Jul. 2, 2010.
U.S. Appl. No. 12/754,974, filed Apr. 6, 2010.
U.S. Appl. No. 12/803,684, filed Jul. 2, 2010.
U.S. Appl. No. 13/324,534, filed Dec. 13, 2011.
U.S. Appl. No. 13/324,575, filed Dec. 13, 2011.
U.S. Appl. No. 13/324,596, filed Dec. 13, 2011.
Ronald Lipman, "Adding family to credit card not always wise," *Houston Chronicle*, dated Jan. 18, 2008, printed from chron.com, 2 pages.
Lawrence Kutner, "Parent & Child," *The New York Times*, dated Aug. 19, 1993, printed from http://query.nytimes.com/gst/fullpage.html?res=9F0CE1DA153CF93AA2575BC0A965958260&sec=&, Internet site, accessed on Feb. 1, 2008, 3 pages.
Jane J. Kim, "Managing Your Money in Public View," *The Wall Street Journal*, dated Jun. 14, 2007, printed from http://online.wsj.com/article/SB118177906703834565.html, Internet site, accessed on Apr. 11, 2008, 5 pages.
"Obopay—Money Transfer by Cell Phone or Web," printed from https://www.obopay.com/consumer/GetHelp.do?target=HelpHowWorks, Internet site, accessed on Apr. 11, 2008, 4 pages.
"BillMonk.com," printed from https://www.billmonk.com/about/tour, Internet site, accessed on Apr. 11, 2008, 8 pages.
"Split It by TD Canada Trust Facebook," printed from http://www.facebook.com/apps/application.php?id=4245957541&ref=nf, Internet site, accessed on Apr. 11, 2008, 2 pages.
"ING Direct Electric Orange Checking Account," printed from http://banking.about.com/od/checkingaccounts/p/ingichecking.htm, Internet site, accessed on Apr. 11, 2008, 1 page.
"Know your financial health—at a glance!" printed from http://www.buxfer.com/tour.php?id=Home_Page, Internet site, accessed on Apr. 11, 2008, 1 page.
"Use Buxfer's analytics to understand your finances," printed from http://www.buxfer.com/tour.php?id=Analytics, Internet site, accessed on Apr. 11, 2008, 1 page.
"Use Buxfer Groups to simplify shared finances," printed from http://www.buxfer.com/tour.php?id=Groups, Internet site, accessed on Apr. 11, 2008, 1 page.
"Report transactions easily; let Buxfer deal with the math," printed from http://www.buxfer.com/tour.php?id=Reporting, Internet site, accessed on Apr. 11, 2008, 1 page.
"Import statements from banks or credit card accounts," printed from http://www.buxfer.com/tour.php?id=Import, Internet site, accessed on Apr. 11, 2008, 1 page.
"Slice and dice through your transactions," printed from http://www.buxfer.com/tour.php?=Filters, Internet site, accessed on Apr. 11, 2008, 1 page.
"Transfer money online with Amazon Payments," printed from http://www.buxfer.com/tour.php?id=Send_money, Internet site, accessed on Apr. 11, 2008, 1 page.
"Setup budgets to control your expenses," printed from http://www.buxfer.com/tour.php?id=Budgets, Internet site, accessed on Apr. 11, 2008, 1 page.
"Access Buxfer while on the move!" printed from http://www.buxfer.com/tour.php?id=Mobile, Internet site, accessed on Apr. 11, 2008, 1 page.
"Take Buxfer with you on the Internet everywhere!" printed from http://www.buxfer.com/tour.php?id=Gadgets, Internet site, accessed on Apr. 11, 2008, 1 page.
"Amazon Payments Account Management," printed from https://payments.amazon.com/sdui/sdui/paymentabout?about=true, Internet site, accessed on Apr. 11, 2008, 1 page.
"Living with a Roommate in Memphis," memphis apartments tv.com, dated Feb. 15, 2007, printed from http://www.memphisapartmentstv.com/living-with-a-roommate-in-memphis/, Internet site, accessed on Sep. 18, 2007, 2 pages.
"Billshare—a simple app for people who share bills," printed from http://billshare.org/, Internet site, accessed on Sep. 18, 2007, 2 pages.
"Get More from Your PayPal Account," printed from https://www.paypal.com/us/cgi-bin/webscr?cmd=xpt/cps/general/AccountOverview-outside, Internet site, accessed on Sep. 18, 2007, 2 pages.
"How PayPal Works—PayPal," printed from https://www.paypal.com/us/cgi-bin/webscr?cmd=xpt/cps/general/NewConsumerWorks-outside, Internet site, accessed on Sep. 18, 2007, 3 pages.
"Sending Money Person-to-Person is Easy," printed from https://www.paypal.com/us/cgi-bin/webscr?cmd=xpt/cps/general/PersonPayments-outside, Internet site, accessed on Sep. 18, 2007, 1 page.
"Track Your Online Spending," printed from https://www.paypal.com/us/cgi-bin/webscr?cmd=xpt/cps/general/TrackingMoney-outside, Internet site, accessed on Sep. 18, 2007, 2 pages.
"Enter Details—PayPal," printed from https://www.paypal.com/us/cgi-bin/webscr?cmd=_flow&SESSION=6paX9BKc4FK4EJ8, Internet site, accrssed on Sep. 18, 2007, 1 page.
"Review Payment Details—PayPal," printed from https://www.paypal.com/us/cgi-bin/webscr?cmd=_flow&SESSION=RMXX7KRmInYnF, Internet site, accessed on Sep. 18, 2007, 1 page.
"Savings Plan," printed from http://quicken.intuit.com/images/screenshots/ss_savings_plan_lrg.gif, Internet site, accessed on Mar. 19, 2008, 1 page.
"Quicken Deluxe 2008," printed from http://quicken.intuit.com/personal-finance/deluxe-money-management.jhtml, Internet site, accessed on Mar. 19, 2008, 7 pages.
"SMS Banking," brochure by Acette Technologies FZ LLC, dated 2007, 3 pages.
Tim Ferguson, "Mobile banking rolled out by HSBC," dated Oct. 4, 2006, printed from http://www.silicon.com/financialservices/0,3800010322,39162983,00.htm Internet site, accessed on Oct. 11, 2007, 2 pages.
Julian Goldsmith, "Cashing in on the ATM revolution," dated May 2, 2007, printed from http://www.silicon.com/financialservices/0,3800010322,39166938,00.htm, Internet site, accessed on Oct. 11, 2007, 3 pages.
Shelley Elmblad, "Online Banking is Easy on Budgets," dated May 22, 2007, printed from http://building-personal-savings.suite101.com/article.cfm/online_banking_get_the_facts, Internet site, accessed on Oct. 12, 2007, 2 pages.
John R. Quain, "Cellphone Banking Is Coming of Age," dated May 24, 2007, printed from http://www.nytimes.com/2007/05/24/technology/24basics.html?_r=1&oref=slogin, Internet site, accessed on Oct. 12, 2007, 4 pages.
"Ducont—Mobile Payments," printed from http://www.ducont.com/Products/bnf_mdhm.htm, Internet site, accessed on Oct. 11, 2007, 1 page.
"Ducont—Bank.companion," printed from http://www.ducont.com/Products/bnf_bankcomp.htm, Internet site, accessed on Oct. 11, 2007, 1 page.
"MyCheckFree.com," printed from https://mycheckfree.com/br/wps?sp=10001&rq=bfbl, Internet site, accessed on Sep. 14, 2007, 1 page.
"About CheckFree," printed from https://mycheckfree.com/br/wps?rq=login&slpg=Y&file=authentication/login_baseline_about-checkfree&esc=93096239&sp=, Internet site, accessed on Sep. 14, 2007, 1 page.
"MyCheckFree—Frequently Asked Questions," printed from https://mycheckfree.com/br/wps?rg=login&slpg=Y&file=authentication/login_baseline_faq&esc=93096239&sp=10001, Internet site, accessed on Sep. 14, 2007, 5 pages.
"Paytrust : Paying Bills Has Never Been Easier," printed from http://www.paytrust.com/learnmore.shtml, Internet site, accessed on Sep. 14, 2007, 2 pages.
"Why Use Paytrust® Instead of a Traditional Bill-Pay Service?" printed from http://www.paytrust.com/morethanbillpay.shtml, Internet site, accessed on Sep. 14, 2007, 3 pages.

(56) References Cited

OTHER PUBLICATIONS

Richard Irons, "What is Envelope Budgeting—Why the Envelope Budgeting System is so Effective?" printed from http://www.mvelopes.com/articles/envelope-budgeting.php, Internet site, 3 pages.
"Pocket Quicken," printed from http://www.landware.com/pocketquicken, Internet site, accessed on Sep. 14, 2007, 2 pages.
"Mobile Quicken™—Stand Alone or Connect with a Click," printed from http://www.landware.com/pocketquicken/moreinfo.html, Internet site, accessed on Sep. 14, 2007, 4 pages.
"UnitedOne Credit Union," printed from http://www.unitedone.org/ASP/home.asp, Internet site, accessed on Sep. 14, 2007, 3 pages.
"UnitedOne Credit Union—Calendar Help," printed from https://s146.lanxtra.com/servlet/EchoTemplateServlet?template=/2/en/IBHelp.vm&help=10901 Internet site, accessed on Sep. 14, 2007, 5 pages.
"Quicken Starter Edition 2008," printed from http://quicken.intuit.com/personal-finance/starter-edition-personal-budget.jhtml, Internet site, accessed on Sep. 14, 2007, 5 pages.
"Jul. 2007 calendar," printed from http://quicken.intuit.com/images/screenshots/ss_calendar_lrg.gif, Internet site, accessed on Sep. 14, 2007, 1 page.
"Navigator," dated Jul. 2006, printed from www.pscu.org, Internet site accessed on Oct. 17, 2007, 2 pages.
"Bank of America Privacy Assist Premier™—Protect your credit and identity," printed from http://www.bankofamerica.com/pap/index.cfm?template=pap_assist_premier, Internet site, accessed on Oct. 17, 2007, 2 pages.
"Identity Theft Protection—Bank of America Privacy Assist Premier™," printed from http://www.bankofamerica.com/pap/index.cfm?template=pap_assist_premier, Internet site, accessed on Oct. 17, 2007, 2 pages.
"Bank of America—Online Bill Pay and e-Bills Frequently Asked Questions," printed from http://www.bankofamerica.com/onlinebanking/index.cfm?template=faq_billpay, Internet site, accessed on Oct. 17, 207, 2 pages.
"Technology Credit Union," printed from http://www.techcu.com/resources/about_tech_cu/privacy/online.htm, Internet site, accessed on Oct. 17, 2007, 1 page.
"Billshare.org—Make Bill Paying with Roomies Easy—KillerStartups.com," printed from http://www.killerstartups.com/Web20/billshare--Make-Bill-Paying-with-Roomies-Easy/, Internet site, accessed on Sep. 18, 2007, 4 pages.
Every Penny Counts, Inc., Patent Property Due Diligence Chart, prepared Aug. 30, 2007, 8 pages.
David A. Moss, Gibbs A. Johnson, "The rise of consumer bankruptcy: Evolution, revolution, or both?" *American Bankruptcy Law Journal*, v. 73, n. 2, pp. 311-351, Spring 1999, printed from http://dialogquicksearch.dialog.com/USPTO/search/getDocument.action?r=5cb38c39-dcc8, Internet site, accessed on Sep. 26, 2010, 25 pages.
Phillip Robinson, "Mastering Your Money," *San Jose Mercury News*, Oct. 9, 1994, 3 pages.
Tom Rawstorne, "What's your child buying online?; Alcohol, knives, pornography . . . All bought over the Internet by a 14-year-old boy using a debit card. So why are the banks giving them to children without telling their parents?" *Daily Mail*, London, Jul. 10, 2008, p. 50, retrieved Jun. 30, 2011, 5 pages.
CNNMoney.com, "What are you worth?" printed from http://web.archive.org/web/20021008185050/http://cgi.money.cnn.com/tools/networth/networth.html, Internet site, accessed on Jul. 13, 2011, 2 pages.
Office Action dated Sep. 28, 2010 for U.S. Appl. No. 12/152,073, filed May 12, 2008.
Notice of Allowance dated May 3, 2011 for U.S. Appl. No. 12/152,073, filed May 12, 2008.
Office Action dated Apr. 2, 2009 for U.S. Appl. No. 12/152,028, filed May 12, 2008.
Office Action dated Sep. 16, 2009 for U.S. Appl. No. 12/152,028, filed May 12, 2008.
Office Action dated Jun. 15, 2010 for U.S. Appl. No. 12/152,028, filed May 12, 2008.
Office Action dated Oct. 1, 2010 for U.S. Appl. No. 12/152,074, filed May 12, 2008.
Office Action dated Apr. 13, 2010 for U.S. Appl. No. 12/120,995, filed May 15, 2008.
Notice of Allowance dated Sep. 23, 2010 for U.S. Appl. No. 12/120,995, filed May 15, 2008.
Office Action dated Jul. 8, 2011 for U.S. Appl. No. 12/366,711, filed Feb. 6, 2009.
Office Action dated Aug. 4, 2011 for U.S. Appl. No. 12/479,378, filed Jun. 5, 2009.
Office Action dated Jan. 3, 2012 for U.S. Appl. No. 12/696,968, filed Jan. 29, 2010.
Office Action dated Jan. 3, 2012 for U.S. Appl. No. 12/696,959, filed Jan. 29, 2010.
Office Action dated Mar. 21, 2012 for U.S. Appl. No. 12/366,711, filed Feb. 6, 2009.
Office Action dated Mar. 15, 2012 for U.S. Appl. No. 12/479,378, filed Jun. 5, 2009.
Yahoo! UI Library: Slider, accessed via Way Back Machine, Oct. 6, 2006, http://web.archive.org/web/20061006221351/http://developer.yahoo.com/yui/slider/, on Mar. 8, 2012, 3 pages.
"How can I automatically generate an index in Word ?," printed from http://word.mvps.org/faqs/formatting/CreateIndexContent.htm, Internet site, accessed on Feb. 17, 2011, 4 pages.
"PeopleSoft Enterprise Human Capital Management—Employee Benefits and Compensation Modules," printed from http://www.2020software.com/products/PeopleSoft_Enterprise_Human_Capital_Management_Employee_Benefits_and_Compensation_Modules.asp., Internet site, accessed on Jul. 17, 2011, 7 pages.
"Free Online Employee Attendance Tracking Software," printed from http://www.tracksmart.com, Internet site, accessed on Jul. 17, 2011, 2 pages.
"Compensation Software Solutions for Small Business I Taleo," printed from http://www.taleo.com/solutions/taleo-business-edition-comp?_kk=HR% Internet site, accessed on Jul. 17, 2011, 1 page.
"Tracking training has never been so easy." printed from http://www.conductit.com/, Internet site, accessed on Jul. 17, 2011, 2 pages.
"Track Employee Training Easily with Conductor® Employee Education Training Tracking Software," printed from http://www.conductit.com/product.asp, Internet site, accessed on Jul. 17, 2011, 2 pages.
"HSBC Employee Career Track Information," printed from http://www.hsbcusa.com/careers/hsbc_employees/impacted_employee_information.html, Internet site, accessed on Jul. 17, 2011, 2 pages.
"Conductor® at a glance Take the Quick Tour!" printed from http://www.conductit.com/tour.asp#1, Internet site, accessed on Jul. 17, 2011, 11 pages.
"Replicon—Time Tracking made Easy with Web TimeSheet," printed from http://www.replicon.com/Ip/Ip_ta_vacation_tracking.aspx?, Internet site, accessed on Jul. 17, 2011, 2 pages.
Office Action dated Apr. 18, 2012 for U.S. Appl. No. 13/037,063, filed Feb. 28, 2011.

\* cited by examiner

Request Money

✉ To: [Dad@hotmail.com] — 1702

Subject: [PNC SecureNet Money Request from Jane] — 1704

Description
[Dinner at Connie's Pizza] — 1708

Amount
$ [50.00] — 1710

1706:
Hi Dad,
College is really busy, thanks for helping me out with dinner. I will call you Sunday.

Love,
Jane

☐ Send to Mobile       1712 — (Send) (Cancel)

*FIG. 17*

Welcome to Jane's SecureNet Request Page

| Account Information | Billing Information | Confirm and Send |

STEP 1: Enter Your Account Information that you would use to grant John's Request Reimbursement Amount: [▼] ← 2102

Account Type: [Credit Card ▼] ← 2103

First Name: [_____]  ⎫
Last Name: [_____]   ⎬ 2104
Card Type: [Mastercard ▼]   ⎪
Expiration Date: [11 ▼] [2008 ▼] ⎪
Card Verification Number: [____] What's This? ⎭

[back] [Continue]

*FIG. 21*

REQUESTING REIMBURSEMENT FOR TRANSACTIONS

PRIORITY

This application claims the benefit of U.S. Provisional Patent Application Ser. No. 61/148,802, filed on Jan. 30, 2009, which is incorporated herein by reference in its entirety.

BACKGROUND

Banking institutions frequently offer Internet banking products and services to their customers as an alternative to traditional "brick and mortar" banking channels. Such products and services are typically provided via a user interface (UI) of a secure banking Web site that is hosted by the bank and that is remotely accessible by its customers using, for example, a personal computer (PC) or other network-enabled device. Products and services that may be offered to Internet banking customers include, for example, account balance inquiries, electronic funds transfers, transaction information downloads, bill presentment and payment, loan applications, and investment services.

Although existing Internet banking products and services allow customers to manage their accounts and make transfers to billing parties, the inventors have recognized a need for enhanced products and services facilitating transfers of funds among customers and between customers and other parties.

FIGURES

FIG. 17 illustrates one embodiment of a reimbursement user interface that may be provided to the first customer to generate a reimbursement request.

FIG. 21 illustrates one embodiment of a user interface that may be provided to the request recipient to facilitate fulfillment of the request.

DESCRIPTION

Various embodiments may be directed to requesting and causing transfers of funds between customers of the financial institution. This functionality may be useful to any financial institution customers who have need to transfer funds between themselves or with other parties for any reason. For example, this functionality may be useful to financial institution customers who are roommates and have need to split household bills such as, for example, bills for utilities. Also, parties having a contractual or other relationships requiring inter-party monetary transfers may utilize the functionality. In addition, various embodiments may be directed to allowing a customer of the financial institution to request reimbursement from a third party for a completed or pending transaction, who may, but need not necessarily, hold an account at the financial institution. This functionality may also be useful to institution customers who are roommates or who otherwise need to request reimbursement for certain expenses from other parties. According to various embodiments, the reimbursement functionality may be useful to college students, who may request reimbursement for certain expenses from family or friends (e.g., parents) as described hereinbelow.

Figure 1:
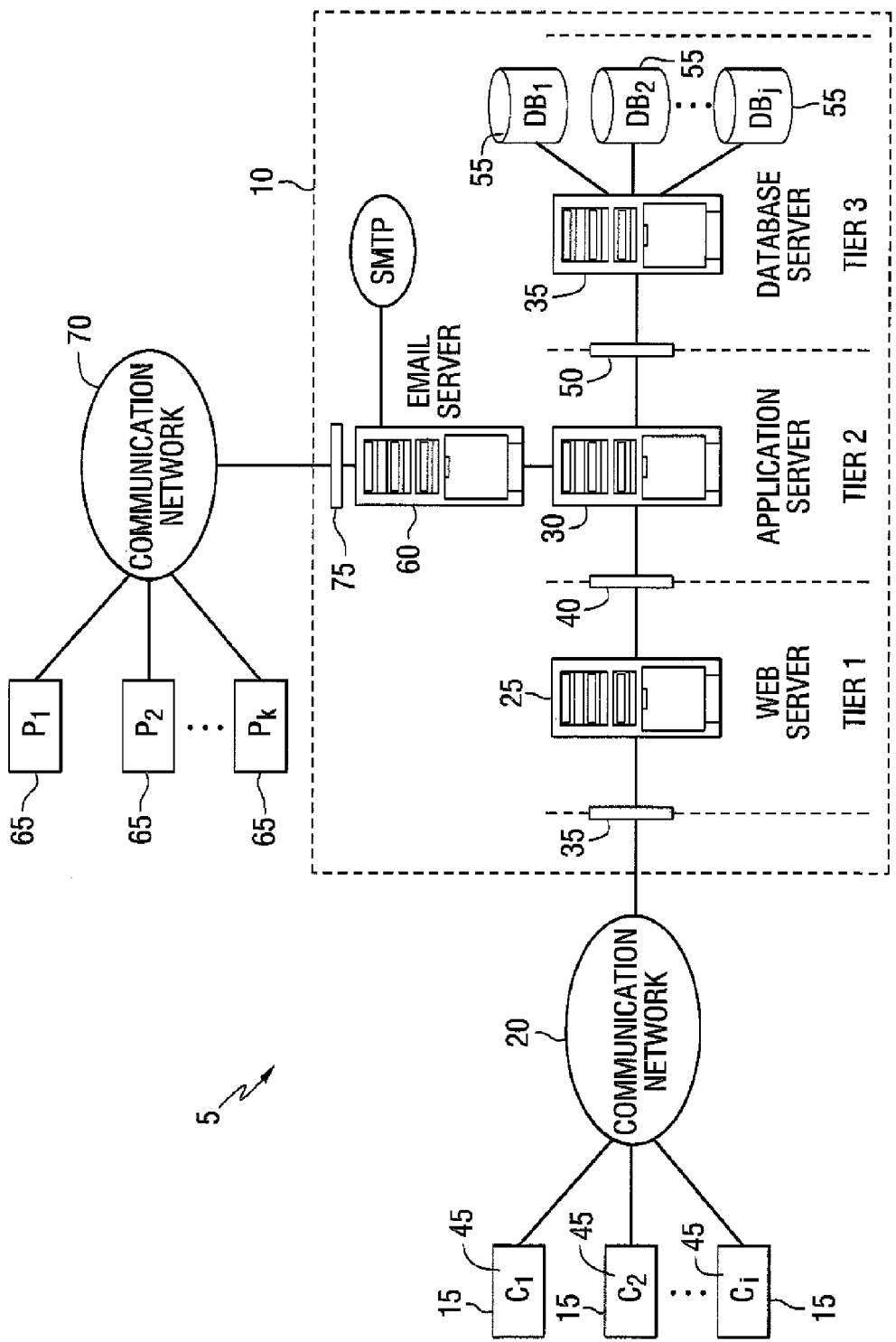
FIG. 1 illustrates one embodiment of a system, which may be implemented by a financial institution to provide network-based banking products for its customers.

FIG. 1 illustrates one embodiment of a system 5, which may be implemented by a financial institution to provide network-based banking products for its customers. For example, the system 5 may be used to facilitate the payment of bills and to facilitate monetary transfers between customers of the financial institution. As shown, the system 5 may include a host system 10 in communication with one or more client devices 15 (hereinafter "clients") via a communication network 20. Each client 15 may be associated with one or more customers of the financial institution and may allow the customers to access the network-based banking products. In some embodiments, client devices 15 may be associated with individuals who do not hold accounts at the financial institution. In the example embodiments described herein, the communication network 20 is implemented using the Internet, although it will be understood that other wired or wireless, public or private communication networks suitable for enabling the exchange of information between the host system 10 and clients 15 may be used instead.

The host system 10 may be constructed and arranged with any suitable combination of components. For example, according to various embodiments, the host system 10 may be arranged in a tiered network architecture and include a Web server 25, an application server 30, and a database server 35. The Web server 25 may correspond to a first tier of the host system 10 and communicate with the communication network 20 (e.g., the Internet) and the application server 30 via a border firewall 35 and an application firewall 40, respectively. The Web server 25 may be configured to accept requests from one or more of the clients 15 via the communication network 20 and provide responses. The requests and responses may be formatted according to Hypertext Transfer Protocol (HTTP) or any other suitable format. The responses may include, for example, static and/or dynamic documents for providing an Internet banking user interface (UI) 45 to customers via the clients 15. The documents may be formatted according to the Hypertext Markup Language (HTML) or any other suitable format. The Web server 25 may further be configured to authenticate each customer's credentials before allowing access to the UI 45 and other banking resources. Such authentication may be performed, for example, using a user name and a password. Additional security measures may be utilized in the authentication process if desired.

A second tier of the host system 10 may comprise an application server 30. The application server 30 may communicate with the Web server 25 and the data base server 35 (e.g., Tier 3) via the application firewall 40 and an internal firewall 50, respectively. The application server 30 may host one or more Internet banking applications for executing the business logic associated with Internet banking features of the UI 45. The application server 30 may receive customer-entered information from the UI 45 of each client 15 via the Web server 25. Such information may include, for example, a user name and password, customer requests to access particular Internet banking features, etc. Based on this and other information received from the clients 15 via the Web server 25, the application server 30 may perform transactions (e.g., transfer funds between accounts, retrieve account balances, transfer amounts to other customer, etc.) and generate corresponding informational content (e.g., transfer confirmations, account balance information, etc.). Information regarding such transactions may be communicated to the Web server 25 and subsequently presented to the customers using, for example, a dynamic Web page of the UI 45.

The third tier of the host system 10 may comprise a database server 35, which may communicate with the application server 30 via the internal firewall 50. The database server 35 may manage one or more databases 55 containing data necessary for supporting one or more Internet banking features. Such databases may include, for example, an account information database, a customer information database, a customer preferences/settings database, as well as other databases for storing additional settings and/or configurations. Such information may be retrieved, processed and updated as needed by the application server 30 based on the particular Internet banking features(s) being used.

The clients 15 may include any suitable network-enabled devices such as, for example, personal computers (PC's), automated teller machines (ATM's), palmtop computers, cellular phones, etc. The clients 15 may be configured to transmit and receive information via the communication network 20 using a wired or wireless connection, and may include a suitable browser software application including, for example, MICROSOFT INTERNET EXPLORER, MICROSOFT INTERNET EXPLORER MOBILE, MOZILLA FIREFOX, PALM BLAZER, etc.) for enabling the customer to display, enter and interact with information exchanged via the communication network 20. The clients 15 may thus access and navigate static and/or dynamic HTML documents of the Internet banking UI 45.

The host system 10 may further include an email server 60 in communication with the application server 30 for enabling the exchange of electronic communications between clients 15 and one more parties 65 externally located with respect to the host system 10. Electronic communications may be exchanged between the email server 60 and the parties 65 via a communication network 70. Although the communication network 70 is depicted separately from the communication network 20 in FIG. 1, it will be appreciated that the communication networks 20, 70 may be implemented using a common communication network (e.g., the Internet). According to various embodiments, the e-mail server 60 and/or the application server 30 may implement an account for some or all of the customers associated with parties 65 or clients 15. Each customer's account may be accessible by the customer and may include communications directed to the customer including, for example, electronic bills, transfer requests, etc. In certain embodiments and as shown in FIG. 1, the host system 10 may include an email firewall 75 disposed between the email server 60 and the communication network 70. The email server 60 may implement an email server application for handling the transfer of electronic communications to and from other email servers and email clients (e.g., clients 15 and parties 65) using any suitable email protocols and standards.

Generally, a party 65 may be any person or entity with whom a client 15 desires to communicate-regarding specific aspects of his finances or financial matters generally. As discussed above, such parties may include, for example, billing parties (e.g., utility companies, credit card companies, etc.). Billing parties may present to the host system 10 electronic bills payable by customers associated with clients 15. The electronic bills may be posted to a customer's account, allowing the customer to pay the bills with a transfer from a financial account. A financial account may be any type of account held by a customer at a financial institution where the financial institution keeps funds of the customer (e.g., checking accounts, savings accounts, investment accounts, etc.). According to various embodiments, parties 65 may also be non-billing parties who have an ongoing financial relationship with a customer (e.g., parents or other family members, roommates or business partners of other customers or other parties who have need to communicate with customers utilizing clients 15).

Figure 2:
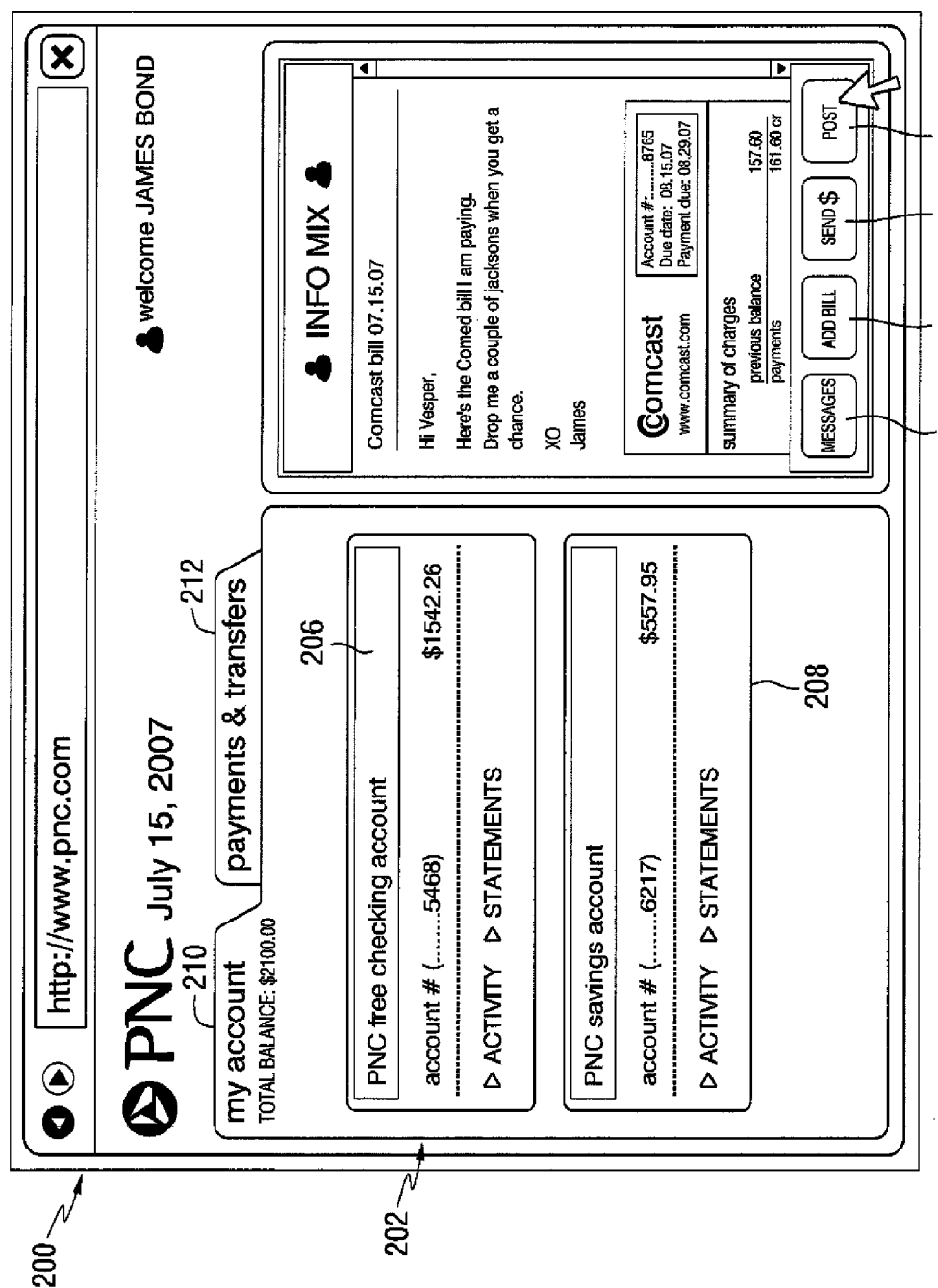
FIG. 2 illustrates a screen shot of one embodiment of a user interface that may be provided to financial institution customers to facilitate transfers of funds between the customers, and to handle bills related to more than one customer.

FIG. 2 illustrates a screen shot of one embodiment of a user interface 200 that may be provided to financial institution customers to facilitate transfers of funds between the customers, and to handle bills related to more than one customer. For example, the user interface 200 may be served to a client 15 and/or a party 65. The user interface 200 may comprise an information window 202 and a transfer window 204. The information window 202 may provide details of financial accounts held by the customer. For example, as shown in FIG. 2, the information window 202 comprises a balance tab 210 and a transactions tab 212. The balance tab 210 is selected in the view shown in FIG. 2, causing the information window 202 to display boxes corresponding to financial accounts held by the customer. For example, FIG. 2 illustrates a checking account box 206 illustrating a balance of the customer's checking account and a savings account box 208 illustrating a balance of the customer's savings account. Selecting the transactions tab 212 may cause the information window 202 to display recent transactions in the viewers financial accounts.

The transfer window 204 may provide information and functionality for requesting and effecting a transfer of funds from a first party to a second party. For example, window 214 may comprise an indication of a bill (e.g., electronic or otherwise) as well as a text message accompanying a transfer or transfer request. Optional window 216 may summarize an amount requested or an amount to be transferred and may, in various embodiments, also include the text message accompanying the transfer or transfer request. Buttons 218, 220, 222, 224 may allow a customer to add a message to a transfer request or transfer (button 218); add an indication of a bill to a transfer or transfer request (button 220); indicate an amount requested or an amount to be transferred (button 222); and/or post the request and/or transfer to an account of at least one other customer (button 224).

Figure 3:
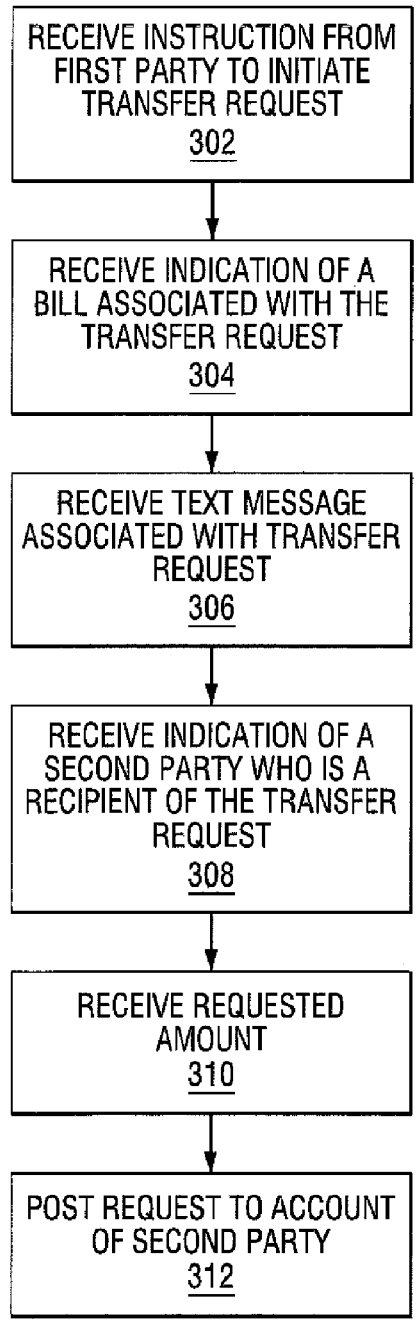
FIG. 3 illustrates one embodiment of a process flow for requesting a transfer of funds between a first party and a second party.

FIG. 3 illustrates one embodiment of a process flow 300 for requesting a transfer of funds between a first party and a second party. The first party and the second party may have any kind of financial relationship calling for a transfer of funds between them. For example, according to various embodiments, the first party and the second party may be roommates. The purpose of the transfer may be to settle a common bill. According to various embodiments, the first party and the second party may both be customers of the financial institution implementing the system 10, or may be customers of different financial institutions.

At box 302, the system 10 may receive an instruction from the first party to initiate a transfer request. For example, the instruction may be handled by a transfer application, which may be resident on the application server 30 and a transfer user interface, such as interface 200, which may be generated by the application server 30, the web server 25 or any other suitable component of the system 10.

At box 304, the system 10 may receive an indication of a bill associated with the transfer request. The bill may be any sort of bill indicating indebtedness between the first party and the second party (e.g., the recipient of the transfer request). For example, the first party and the second party may be roommates, and the bill may be a bill received from one of the parties 65 (e.g., a utility) for the home, apartment, etc., shared by the first party and the second party. According to various embodiments, the bill may be an electronic bill which the first party may or may not have remitted to the billing party. Accordingly, the first party may provide the indication of the bill by selecting it from a list of electronic bills, which may be displayed by the user interface. Also, according to various embodiments, the bill may be a paper bill that has been mailed to the first party. The first party may then provide a textual description of the bill (e.g., an amount, a billing party, etc.), which may be included in the text message described below. In addition to or instead of providing a textual description, the first party may create and upload an electronic copy of the paper bill (e.g., by scanning or otherwise digitizing the paper bill). The bill may also be a contract, or an indication of any other kind of agreement or arrangement between the first party and the second party.

The first party may add a bill to the transfer request, for example, by selecting the Add Bill button 220 from the interface 200. In response, the system 10 may cause the interface 200 to display a list of electronic bills handled by the first party by the financial institution. The first party may then select the bill from the list. If the bill is not an electronic bill, the system 10 may cause the interface 200 to prompt the first party to provide the textual description of the bill and/or generate and provide an electronic copy of the paper bill. It will be appreciated that a single transfer request may, according to various embodiments, include more than one bill.

At box 306, the system 10 may receive a text message associated with the transfer request from the first party. According to various embodiments, the text message may be a series of characters setting forth a message from the first party to the second party. For example, the text message may set forth the reasons for the request and any other background information selected by the first party. According to various embodiments, the text message may indicate a requested amount. Also, according to various embodiments, the first party may cause the system 10 to launch a text editor for entering the text message and/or upload a pre-generated text message by selecting the Messages button 218 from the user interface 200. At box 308, the system 10 may receive from the first party an indication of the second party. If there are recipients of the transfer request other than the second party, these may also be indicated. For example, there may be multiple recipients of the transfer request when the bill is regarding a residence having more than two roommates.

At box 310, the system 10 may receive a requested amount from the first party. If the requested amount is included in the text message, this step may be omitted. The requested amount may represent a share of the bill that is owed by the second party (e.g., some or all of the bill). When there the second party is not the only recipient, each recipient may have an associated requested amount. The requested amounts from different recipients may be the same or different. According to various embodiments, the system 10 may include functionality for calculating a requested amount. For example, the system 10 may receive as input from the first party a number of roommates or other parties among whom the bill will be divided. When the system 10 is not otherwise aware of the amount due on the bill, it may also receive that value from the first party. The amount due on the bill may then be divided among the first party and the second party (and other recipients, if any) according to any suitable method. For example, the amount due may be divided pro rata. Also, according to various embodiments, the amount due may be divided according to pre-determined percentages provided, for example, by the first party. The first party may enter a method for calculating the requested amount or initiate a calculation of a requested amount, for example, by selecting "Send $" button 220 from the interface 200.

At box 312, the system 10 may post the transfer request to an account of the second party (and other recipients, if any). Posting the transfer request to an account may involve storing the transfer request to a storage device (e.g., a database 55) corresponding to an account area accessible by the second party or other recipient, for example, as described above. The first party may request that the transfer request be posted by selecting the Post button 224 from the interface 200. The transfer request may be presented to the second party in a manner similar to the way that an electronic bill is presented. The transfer request may comprise the indication of the bill, and the text message. According to various embodiments, the transfer request may also comprise the indication of the requested amount. When an electronic copy of the bill is present, either because the bill is an electronic bill or if an electronic copy of the bill is received from the first party, the transfer request may comprise the electronic copy of the bill. When there is more than one recipient, the system 10 may post the same transfer request to the accounts of all recipients, or may generate separate transfer requests for each recipient. When one or more of the recipients is not a customer of the financial institution implementing the system 10, posting the transfer request may comprise transmitting the transfer request to at least one additional financial institution used by the second party and/or another recipient.

Figure 4:
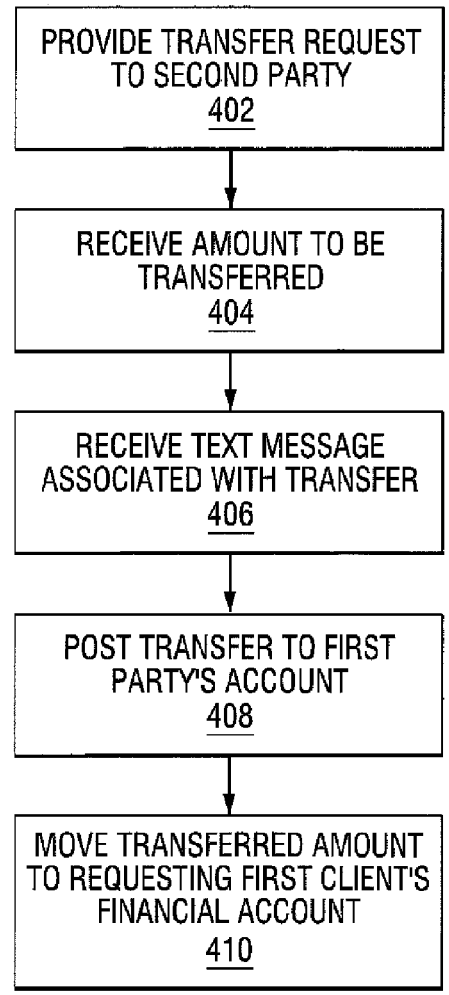
FIG. 4 illustrates one embodiment of a process flow for transferring funds between a first party and a second party.

FIG. 4 illustrates one embodiment of a process flow 400 for transferring funds between a first party and a second party. At box 402, the second party may receive a transfer request, which may have been originated by a first party as described above. The transfer request may comprise an indication of a bill and a text message. As described above, the transfer request may also comprise an electronic copy of a bill and an indication of a requested amount. In various embodiments, the box 402 may be omitted. For example, the second party may initiate a transfer to the first party without having first received a transfer request. In this situation, the second party may provide to the system 10 the indication of the bill and an amount to be transferred, for example, by utilizing Add Bill button 220 and Send $ button 222 from the interface 200. Also, according to various embodiments, the second party may respond to a transfer request by making a transfer to the first party with an amount sufficient to cover the second party's share of the bill indicated in the transfer request as well as one or more additional bills. Indications of these additional bills may be received from the second party.

Referring back to the process flow 400, at box 404 the system 10 may receive from the second party an amount to be transferred. The second party may enter this amount, for example, by selecting the "Send $" button 220 from the interface 200. If an indication of a requested amount is present in a transfer request, the amount to be transferred may or may not match the requested amount. For example, the second party may dispute the requested amount, or may simply not have the funds necessary to pay the requested amount. While responding to a transfer request and/or generating a transfer without a transfer request, the second party may view the information window 202 to gain an indication of the funds that the second party has available in his or her various financial accounts.

At box 406, the system 10 may receive a text message associated with the transfer. The text message may include characters conveying any type of message from the second party to the first party. According to various embodiments, the system 10 may launch a text editor, or prompt the second party to upload a pre-generated text message in response to the second party actuating the Messages button 218. At box 408, the system 10 may post a receipt of the transfer to the first party's account. For example, posting the receipt to an account may involve storing the transfer request at a storage device corresponding to an account area accessible by the first party. The receipt may comprise an electronic copy of the bill, the amount to be transferred, and the text message provided by the second party. At box 410, the system 10 may transfer the amount to be transferred from a financial account of the second party to a financial account of the first party.

Figure 5:
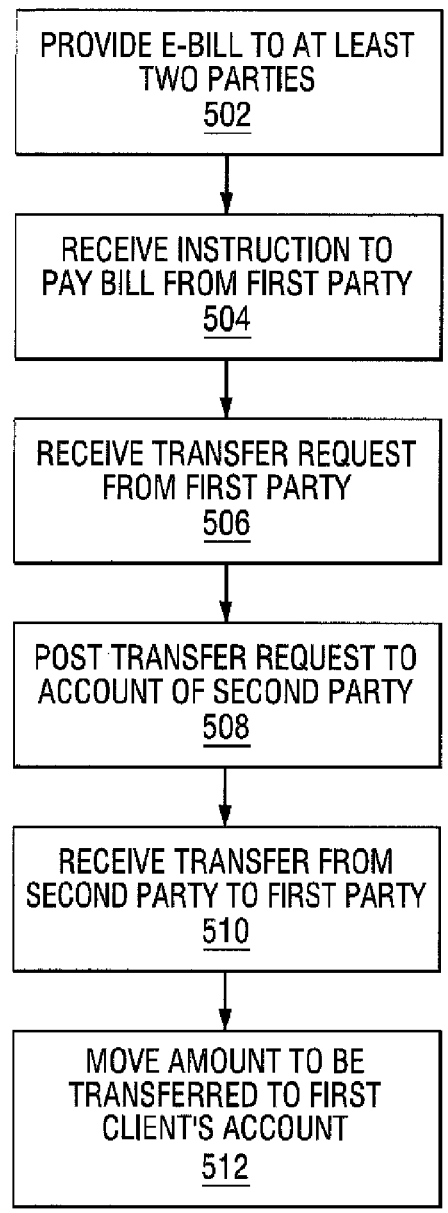
FIG. 5 illustrates one embodiment of a process flow for providing an electronic bill to multiple parties.

FIG. 5 illustrates one embodiment of a process flow 500 for providing an electronic bill to multiple parties. At box 502, an electronic bill may be provided to two or more parties. According to various embodiments, the parties may be customers of the financial institution implementing the system 10, although one or more of the parties may be customers of other financial institutions instead. At box 504, the system 10 may receive an instruction to pay the electronic bill from a first party selected from the parties receiving the electronic bill. The system 10 may then transfer an amount equal to the total due on the bill from a financial account of the first party to the billing party 65. At box 506, the system 10 may receive a transfer request from the first party to one or more recipients including, for example, a second party. The recipients may also be selected from the parties receiving the electronic bill. The transfer request may be posted to the account of the second party, and accounts of other recipients, if any, at box 508. The transfer request may be generated and posted, for example, as set forth above by process flow 300.

At box 510, the second party may direct a transfer to the first party, for example, as described above with respect to process flow 400. The amount to be transferred may then be moved from a financial account of the second party to a financial account of the first party at box 512. The amount transferred may be equal to a requested amount and/or an amount of the bill that is owed by the second party. According to various embodiments, boxes 504, 506 and 508 may be omitted. For example, the second party may initiate a transfer request at box 510 before the first party has paid the bill and/or before the first party has made a transfer request.

Figure 6:
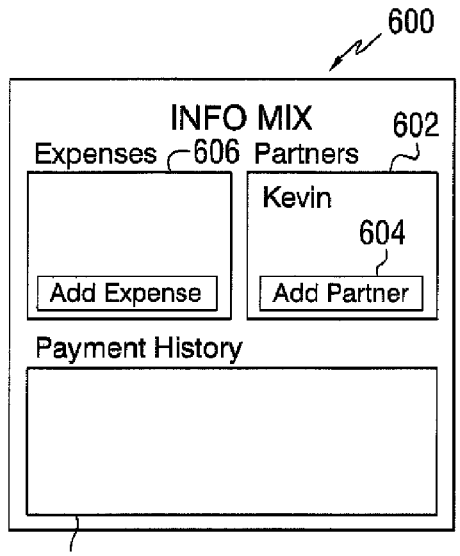
FIG. 6 illustrates one embodiment of a user interface for managing bills and other expenses shared between parties, such as roommates.

FIG. 6 illustrates one embodiment of a user interface for managing bills and other expenses shared between parties, such as roommates. The interface 600 may be implemented by the system 10 and, for example, by the application server 60. The interface 600 may comprise a Partners field 602, which may list various parties, or partners, sharing expenses. The interface 600 may also include an Expenses field 606 showing a listing of shared expenses and a Payment History field 618 showing a listing of various payments associated with the expenses including, for example, payments to billing parties 65, amounts paid by various parties, transfer requests, etc.

The interface 600 may be provided to all of the parties, however, some features (e.g., adding and subtracting bills, adding and subtracting parties, etc.), may not be available to all parties. The interface may be initiated by one party, referred to as an originating party. The originating party may then invite their roommates or other individuals with whom they share expenses to become parties according to any suitable method. For example, the originating party or other user may select the add partner button 604. This may cause the user interface 600 to prompt the originating party or other party to identify a potential party. The potential party may then be provided with a communication inviting them to become a party. The communication may take various forms. For example, the communication may be an e-mail sent to a personal e-mail account of the potential party. The communication may also be an e-mail sent to an account of the potential party associated with the financial institution (e.g., implemented by e-mail server 60), or any other suitable message type provided to the potential party by the financial institution. This communication may include a link to the interface 600. When the originating party and the potential party are not customers of the same financial institution (e.g., the financial institution implementing the user interface 600), then the communication may include in invitation for the potential party to open an account with the originating party's financial institution. Some embodiments, however, do not require a potential party to have an account with the financial institution implementing the interface 600.

Figure 7:
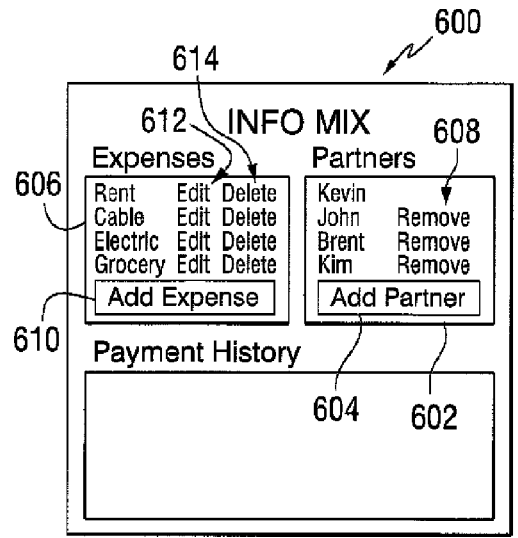
FIG. 7 illustrates one embodiment of the user interface of FIG. 6 with additional partners listed at a Partners field.

FIG. 7 illustrates one embodiment of the user interface 600 with additional parties, or partners, listed at Partners field 602. Each additional party may have a Remove button positioned next to their name. Selecting the Remove button next to a party's name may cause the partner to be removed from the Partners field 602 and from consideration by the interface 600 for payment of shared expenses. This may allow a party to be removed from consideration for shared expenses, for example, when his or her liability for shared expenses ceases. For example, when a roommate moves out, he or she may be removed as a party.

Figure 8:
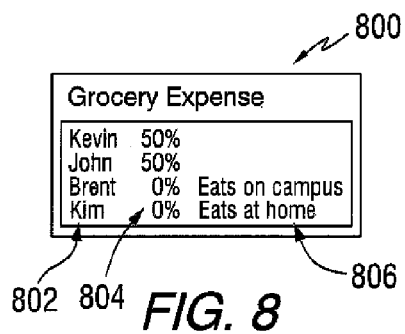
FIG. 8 illustrates one embodiment of a screen of the user interface of FIG. 6 that may be presented to an originating partner or other user allowing them to enter and/or modify the terms of a shared expense.

Referring now to the Expenses field 606, new expenses may be added, for example, by selecting the Add Expense button 610. Each expense listed at field 606 may have an associated Edit button 612 and Delete button 614. FIG. 8 illustrates one embodiment of a screen 800 of the user interface 600 that may be presented to an originating party or other user allowing them to enter and/or modify the terms of a shared expense. For example, the screen 800 may be shown when the Add Expense button 610 and/or one of the Edit buttons 612 is selected. As shown in FIG. 8, the screen 800 relates to grocery expenses. Partners field 802 may list each party. A percentage field 804 may list a portion of the shared expense owed by each party. A comment field 806 may allow comments regarding each party's obligation to be entered. In some embodiments, the screen 800 may default to a pro rata distribution of the expense. For example, the embodiment shown in FIG. 8 includes four parties, so a default distribution may have 25% of the expense attributed to each party. The originating party, or other user, however, may be able to change the distribution of the expense for various reasons. For example, as illustrated in FIG. 8, a grocery expense is split between two parties, while the other two parties pay none of that expense. The reason for this distribution is entered at comment field 806. In some embodiments, parties who do not have responsibility for an expense may not be listed at Partners field 802.

Expenses may paid from the parties' financial accounts according to any suitable method. For example, a party selected from the group may be responsible for each expense (e.g., the expense may be ultimately paid from the financial account of the responsible party). Other parties sharing a given expense may transfer funds to the financial account of the responsible party to cover their responsibility. The responsible party may be the originating party or any other party selected from the group. According to various embodiments, different parties may be responsible for different expenses. In some embodiments, the financial institution may set up an account shared by all of the parties. Expenses may be paid from the shared financial account, and all parties sharing a given expense may transfer funds to the shared financial account to cover their share.

Figure 9:
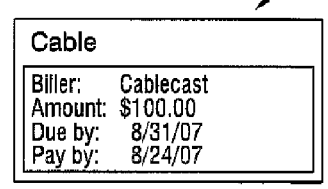
FIG. 9 illustrates one embodiment of a screen of the user interface of FIG. 6 showing a posting of an expense.
Figure 10:
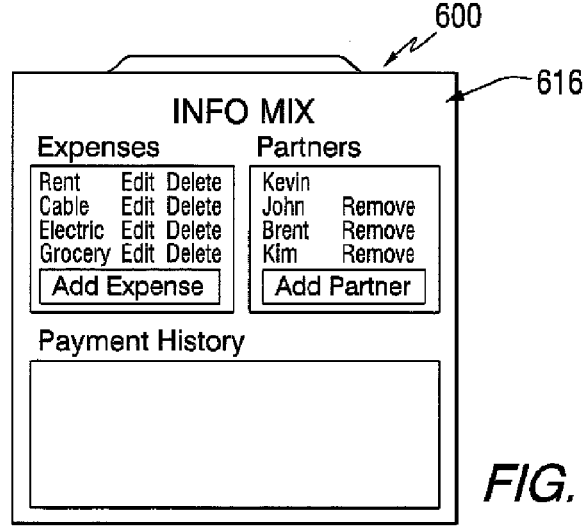
FIG. 10 illustrates one embodiment of the user interface of FIG. 6 including an indication that a transfer request has been received.

When an expense is received, it may be posted to the user interface 600. An expense may be received, for example, when it is accrued and/or when a bill for the expense is received. Expenses may be posted according to any suitable manner. For example, the responsible partner may manually post an expense. Also, for example, an expense may be posted automatically (e.g., after an electronic bill is received for the expense, and/or according to a periodic schedule). Once an expense is posted to the interface 600, it may be shown at Payment History field 618. Also, FIG. 9 illustrates one embodiment of a screen 900 of the user interface 600 showing a posting of an expense. The screen 900 may include information about the expense including, for example, a billing party 65, an amount of the expense, a due date, and a target pay date. The responsible party may prepare transfer requests to the other parties, or the transfer request may be generated automatically. FIG. 10 illustrates one embodiment of the user interface 600 having an indication 616 that a transfer request has been received. This view may be shown to parties from whom a transfer is requested.

Figure 11A:
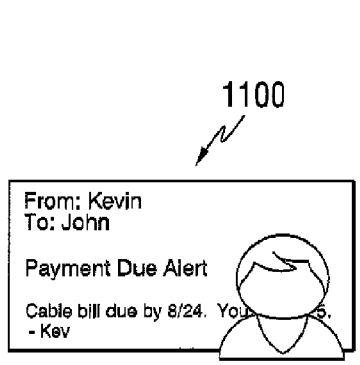
FIG. 11A illustrates one embodiment of a transfer request e-mail.

A transfer request may be accessed by the parties according to any suitable method. For example, a transfer request may be communicated to the parties as an e-mail. FIG. 11A illustrates one embodiment of a transfer request e-mail 1100. The e-mail may include a text message as well as other components including, for example, a requested amount, a due date, etc. The party may complete the requested transfer according to any suitable method including, for example, by replying to the e-mail. FIG. 11C illustrates one embodiment of a transfer request mobile phone message 1102. The message 1102 may be similar to the e-mail 1100, but may be formatted to be received on a mobile phone (e.g., Short Message Service (SMS) format). Again, the party may complete the requested transfer according to any suitable method including, for example, by replying to the message 1102.

Figure 11B:
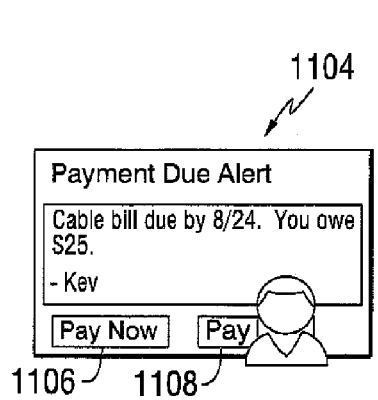
FIG. 11B illustrates one embodiment of a transfer request implemented as an interactive screen of the user interface of FIG. 6.
Figure 11C:
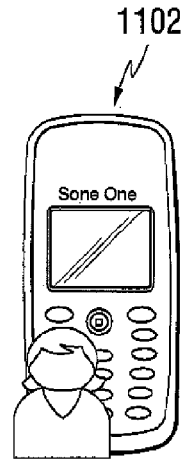
FIG. 11C illustrates one embodiment of a transfer request mobile phone message.
Figure 12:
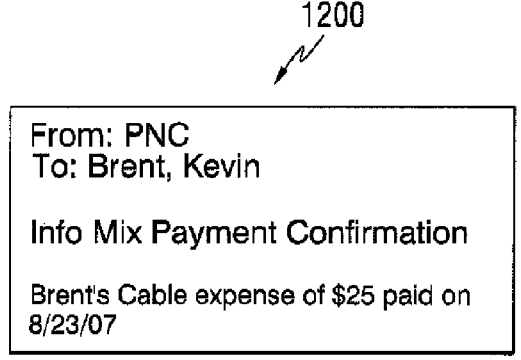
FIG. 12 illustrates one embodiment of a payment confirmation message that may be provided to a partner after they have transferred funds to cover an expense.

FIG. 11B illustrates one embodiment of a transfer request implemented as an interactive screen 1104 of the user interface 600. The screen 1104 may include information similar to that of message 1102 and e-mail 1100. The screen 1104 may also include functionality for completing the requested transfer. According to various embodiments, the parties may log into interface 600 to access the user screen 1104 after receiving an e-mail 1100 or message 1102. The screen 1104 may include a Pay Now button 1106. Selecting this button may allow a party to make the requested transfer. A Pay Later button 1108 may allow the party to schedule the requested transfer at some point in the future (e.g., after a payday). The payment of a transfer request may also be posted to the Payment History field 618. Making a requested transfer may involve transferring the requested amount from a financial account of the payer to a financial account of the payee. After completing a requested transfer, a party may receive a payment confirmation. FIG. 12 illustrates one embodiment of a payment confirmation message 1200 that may be provided to a party after they have transferred funds to cover an expense. The message 1200 may be provided to a party according to any suitable method including, for example, via e-mail and/or via the interface 600.

Figure 13:
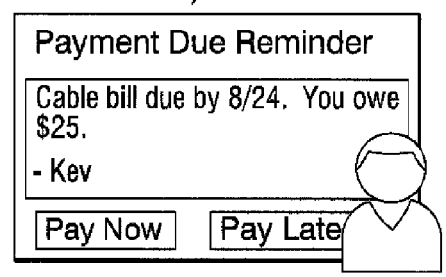
FIG. 13 illustrates one embodiment of a Payment Due Reminder screen of the user interface of FIG. 6.
Figure 14:
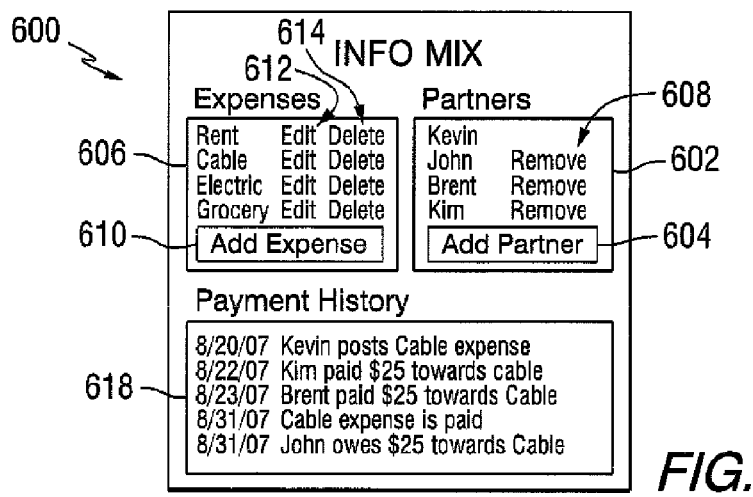
FIG. 14 illustrates one embodiment of the user interface of FIG. 6 indicating that a cable expense has been paid.

Various embodiments may be directed to systems and methods for reimbursing bank customers for completed transactions. This functionality may be utilized in a variety of settings. For example, a college student may utilize the system to request reimbursement from a parent or other individual for expenses such as books, food, etc. Expense reimbursement may also be useful to roommates in the context described above. For example, one roommate may pay a bill and request reimbursement for all or a portion of the bill from the other roommates. Also, for example, friends or family may request reimbursement for various items including, for example, commonly given gifts, meals, etc.

Where the expense is an electronic bill from a billing party 65, it may be automatically paid upon receipt of all requested transfers from the parties. According to various embodiments, the expense may also be automatically paid at a predetermined time on or in advance of a due date for the expense regardless of whether all requested transfers have been received by the responsible partner. Once an expense is paid, it may be marked as being paid at the Payment History field 618. FIG. 14 illustrates one embodiment of the user interface 600 indicating that a cable expense has been paid. If an expense is paid before all of the requested transfers are received, parties who have not yet made the requested payment may receive a reminder. FIG. 13 illustrates one embodiment of a Payment Due Reminder screen 1300 of the user interface 600. In some embodiments, the sending of the reminder may be posted to the Payment History field 618, as shown in FIG. 14.

Figure 15:
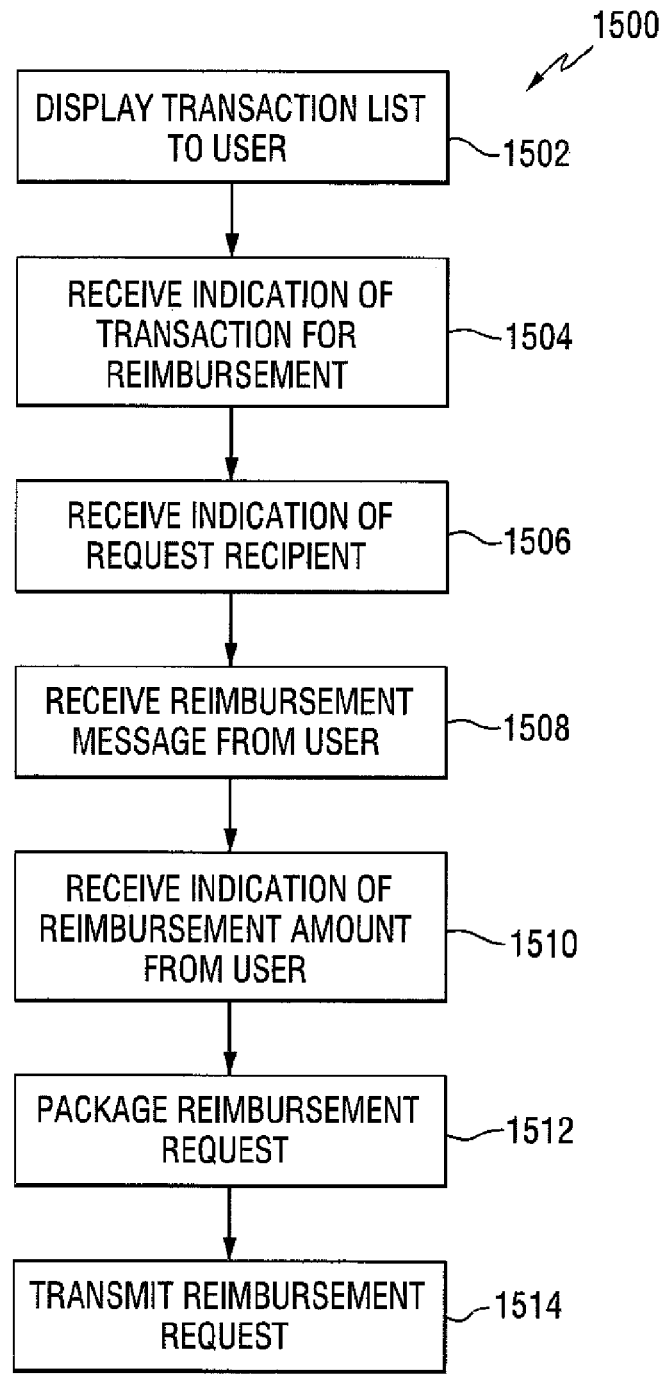
FIG. 15 illustrates one embodiment of a process flow that may be implemented by the system of FIG. 1 to prepare and send a reimbursement request.

FIG. 15 illustrates one embodiment of a process flow 1500 that may be implemented by the system 10 (e.g., by an application server 30) to prepare and send a reimbursement request from a first customer of the financial institution. The process flow 1500 will be described in conjunction with user interfaces 1600 and 1700 shown in FIGS. 16 and 17, respectively.

Figure 16:
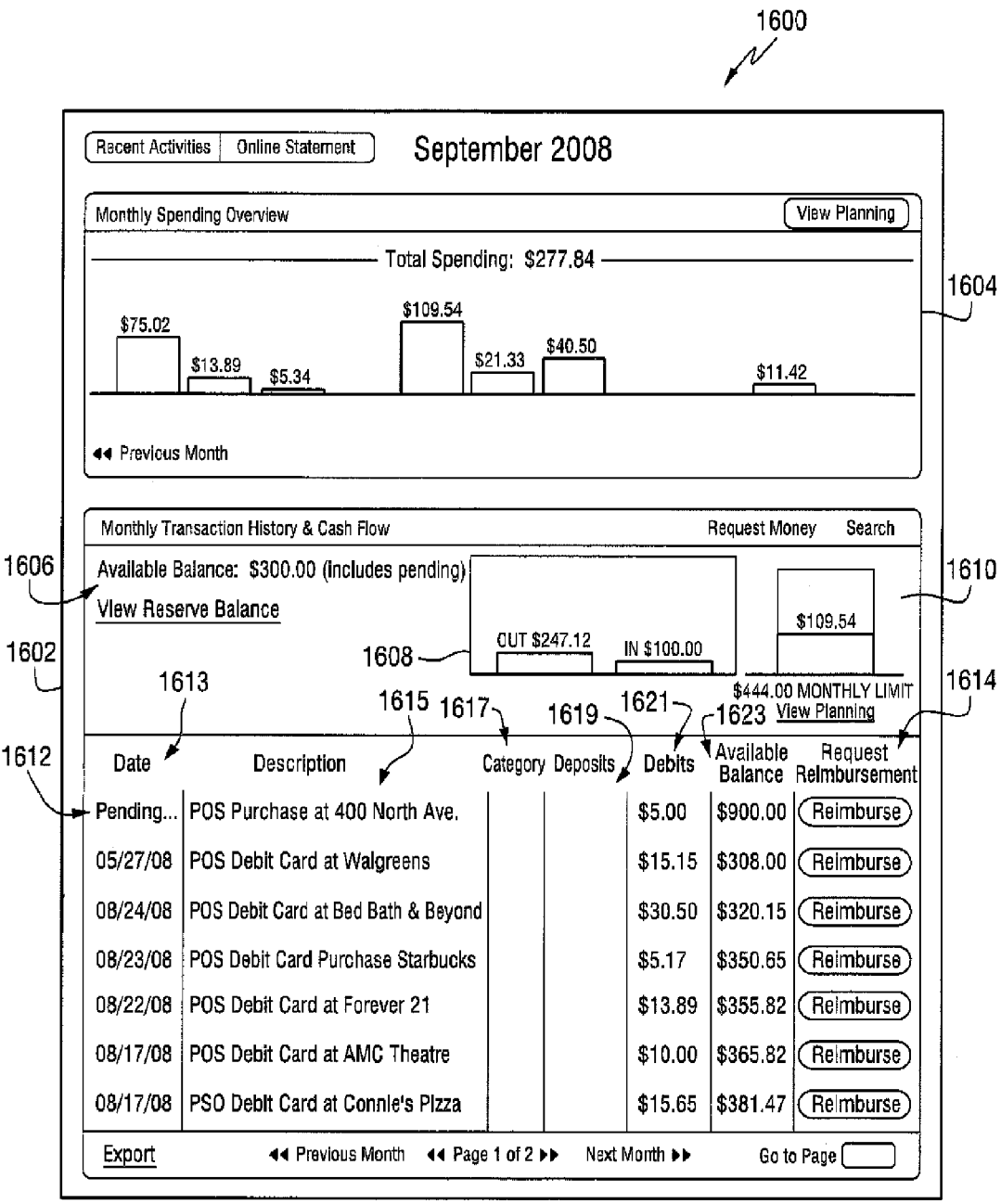
FIG. 16 illustrates one embodiment of an example user interface that may be shown to the first customer.

The first customer of the financial institution may have at least one account at the financial institution (e.g., a deposit account such as a checking account, a savings account, or an investment account, a credit account such as a credit card, etc.). The system 10 may display to the first customer a user interface comprising a list of executed and/or pending transactions on an account of the first user, 1502. FIG. 16 illustrates one embodiment of an example user interface 1600 that may be shown to the first customer. The interface 1600 may be a part of the Internet baking user interface 45 and may be provided to the first customer on any suitable client device 15.

The interface 1600 may comprise a transaction history window 1602 that may list individual transactions on the first customers account including, for example, transactions that have cleared the first customer's account and transactions that are pending on the first customer's account. The example user interface 1600 includes other optional features. For example, a spending overview window 1604 comprises a bar graph illustrating the break down of transactions on the account by spending category. A cash flow field 1608 may graphically indicate the amount of money that has been transferred into the account relative to the amount of money that has been transferred out of the account, for example, over a month or other suitable period. A limit field 1610 may illustrate how much money the first customer has remaining from a periodic (e.g., monthly) budget.

Each transaction may be indicated by a row 1612 of the transaction history window 1602. Columns of the transaction history window 1602 may indicate various information about the transaction including, for example: a date of the transaction (1613); a description of the transaction (1615); a category of the transaction (1617); a deposit, if any, associated with the transaction (1619); a debit, if any, association with the transaction (1621) and an available balance in the account after the transaction has cleared (1623). Various other transactions may be presented in other columns that may be displayed in addition to or instead of the columns shown. In addition, the transaction history window 1602 may comprise a reimbursement column 1614. To request reimbursement for a transaction, the first customer may select the reimbursement column 1614 at the row corresponding to the transaction to be reimbursed. Accordingly, referring back to FIG. 15, the system 10 may receive an indication of the transaction to be reimbursed, 1504.

FIG. 17 illustrates one embodiment of a reimbursement user interface 1700 that may be provided to the first customer to generate a reimbursement request. At field 1702, the first customer may enter an indication of a recipient of the reimbursement request, 1506. The indication may be in any suitable form. For example, according to various embodiments, the indication may comprise a standard Internet e-mail address (e.g., suitable for Simple Mail Transfer Protocol (SMPT) delivery). Also, for example, the indication may be internal to the system 10 (e.g., a proprietary indication of another bank customer). According to various embodiments, the first customer may pre-populate a list of potential recipients. In this way, each potential recipient may become a customer of the financial institution and/or may configure personal reimbursement settings, for example, as described below.

A subject field 1704 and a body field 1706 may provide the first customer with a space to enter a text message to the request recipient. In this way, the system 10 (e.g., application server 30) may receive the text message, 1508. According to various embodiments, the subject field 1704 may be pre-populated. For example, the subject field 1704 may indicate that the request is a reimbursement request and is from the first customer. The first customer may have the ability to modify the subject field. The body field 1706 may give the first customer an opportunity to enter a personalized message to the recipient. The message, for example, may explain the nature of the request.

A transaction description field 1708 may list the description of the transaction, for example, from column 1615 of the transaction window 1602. In some embodiments, this window may not be editable by the first user. This may prevent the first user from misrepresenting the nature of the transaction to the recipient. A reimbursement amount field 1710 may be pre-populated with an indication of the amount of the transaction to be reimbursed. According to various embodiments, the first customer may be able to modify the reimbursement amount to request more or less than the amount of the transaction. In this way, the system 10 may receive the reimbursement amount (e.g., either the pre-populated amount or an amount modified by the first customer). In some embodiments, it may not be possible for the first customer to enter a reimbursement amount that is more than the amount of the transaction. For example, when the first customer is a college student, it may be desirable to prevent the college student from requesting a reimbursement higher than their actual expense.

When the information displayed by the interface 1700 is acceptable to the first customer, the first customer may activate the Send button 1712 to initiate the packaging 1512 and transmission 1514 of the reimbursement request. Packaging of the reimbursement request may involve taking the information shown and/or received by the interface 1700 and converting it into an e-mail or other message format (e.g., Internet e-mail format, a proprietary format, etc.). For example, the request may be formatted into a standard e-mail format that includes extra fields for the transaction description and the reimbursement amount.

The transmission of the reimbursement request may take different forms in different embodiments. For example, in embodiments where the recipient of the reimbursement request is also a customer of the financial institution, the reimbursement request may be recorded in a database and made available to the recipient via the Internet UI 45 upon their next log-in. According to various embodiments, a reminder or indication that the request has been received may be sent to a client device 15 associated with the recipient, such as, for example, a palmtop computer or mobile phone. Also, for example, the e-mail server 60 may direct the indication as an e-mail to an external account associated with the recipient. In embodiments where the recipient is not a customer of the financial institution, the reimbursement request may be sent directly to the recipient at an external e-mail (e.g., not associated with the financial institution) or other account. In some embodiments, the non-customer recipient may have previously set up a limited account with the financial institution, allowing the non-customer to be provided with a limited version of the Internet UI 45 suitable for responding to reimbursement requests.

Figure 18:
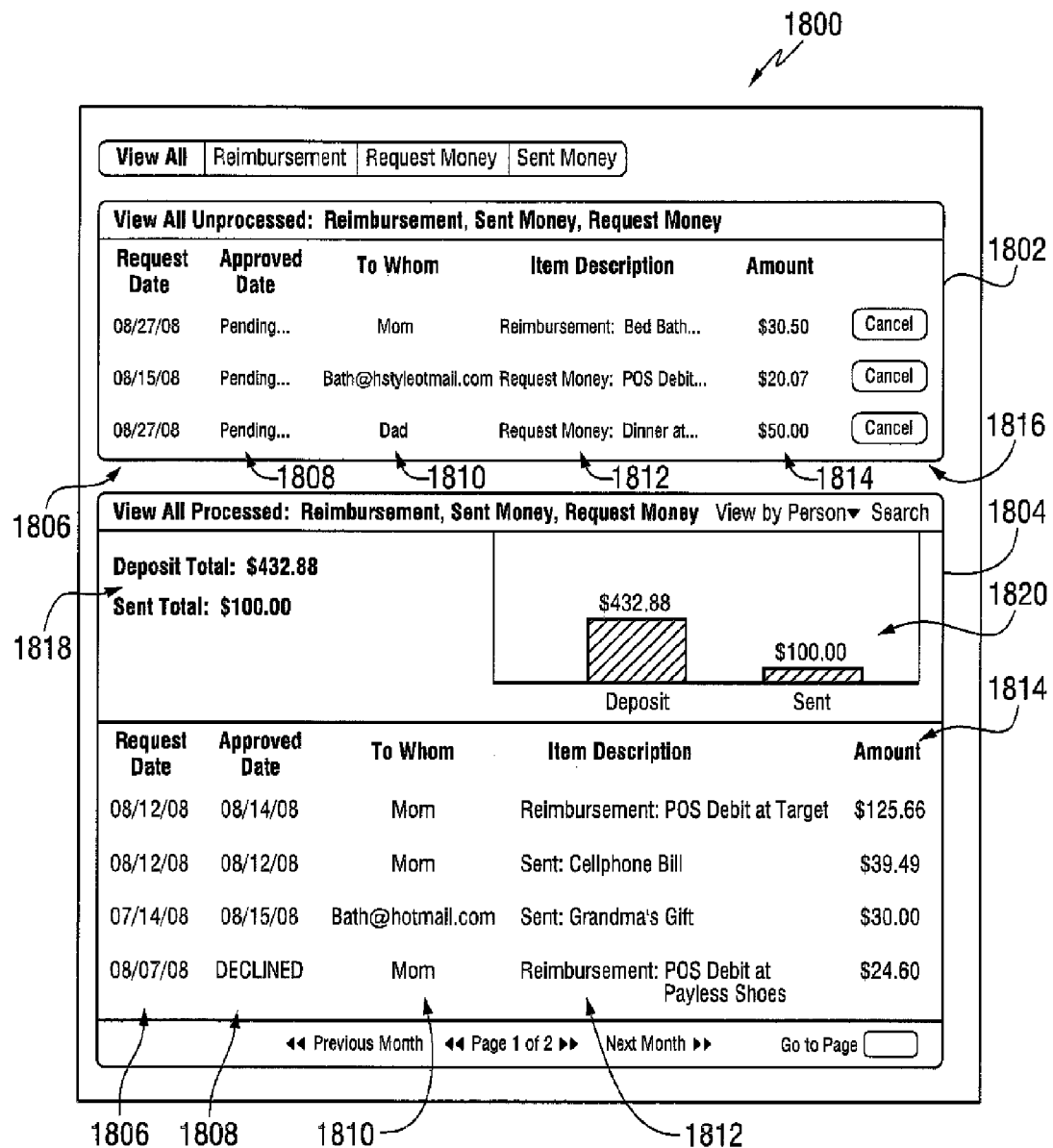
FIG. 18 illustrates one embodiment of a user interface that may be shown to the first customer to indicate the status of recent and pending reimbursement requests.

FIG. 18 illustrates one embodiment of a user interface 1800 that may be shown to the first customer to indicate the status of recent and pending reimbursement requests. The interface 1800, for example, may be embodied as a screen of the Internet UI 45. The interface 1800 may comprise a pending requests window 1802 and a processed requests window 1804. Each window 1802, 1804 may comprise rows corresponding to individual reimbursement requests made by the first customer. A request date column 1806 may indicate the date on which the request was made. An approved date column 1808 may indicate the date on which a reimbursement request was approved and fulfilled by the recipient. For pending requests shown in pending requests window 1802, the approved date may be listed as "pending." Also, for example, if a request shown in the processed requests window 1804 has been declined, that may be indicated in the approved date column. A "to whom" column 1810 may indicate the recipient of the request. An item description column 1812 may indicate a description of the transaction for which reimbursement was requested. In the pending requests window 1802, the amount column 1814 may indicate the amount of the request. In the processed request window 1804, the amount column 1814 may indicate the amount that was actually reimbursed. In the pending requests window 1802, each request may also comprise a cancel button in a cancel column 1816. Selecting the cancel button may cause the corresponding reimbursement request to be cancelled. In some embodiments, the interface 1800 may also comprise indications of reimbursement metrics. For example, the total amount sent by the first customer in reimbursements to others as well as the total amount received in reimbursements are shown textually at field 1818. The same values are shown graphically at field 1820.

Figure 19:
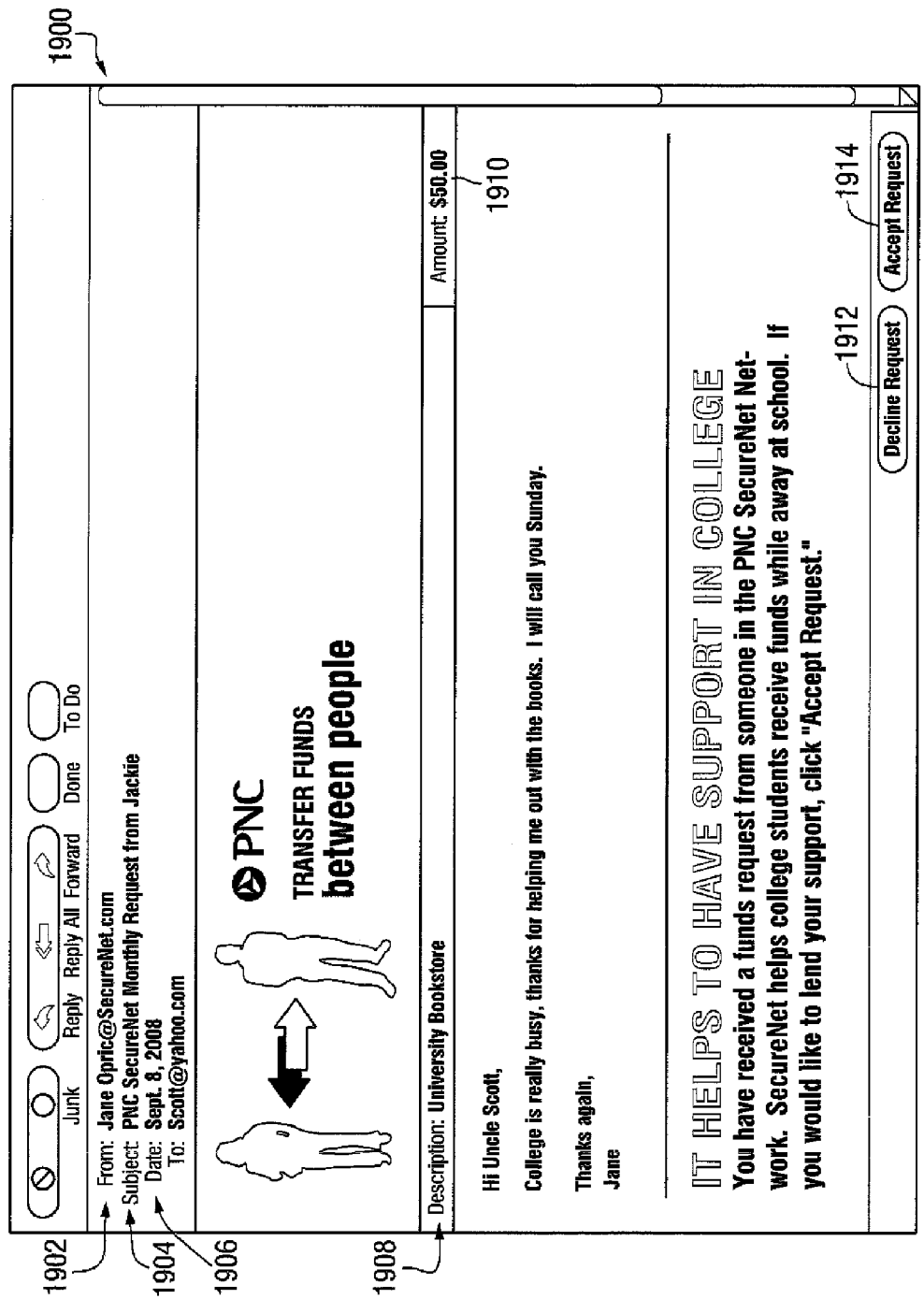
FIG. 19 illustrates one embodiment of a reimbursement request that may be provided to a recipient.

FIG. 19 illustrates one embodiment of a reimbursement request interface 1900 that may be provided to a recipient. The interface 1900 may be displayed to the recipient via the recipient's Internet interface 45. In embodiments where the recipient is not a customer of the financial institution, the interface 1900 may be provided as an e-mail or other suitable message. Also, in some embodiments, the interface 1900 may be part of an interface that the recipient has with the financial institution for the limited purpose of responding to reimbursement requests. For example, an individual who expects to receive reimbursement requests from a customer of the institution may set up such a limited purpose interface.

Referring back to FIG. 19, the interface 1900 may include various information including a sender (field 1902), a subject (field 1904), and a request date (field 1906). A transaction description (field 1908) and request amount (field 1910) may also be provided. Buttons 1914 and 1912 may allow the recipient to accept (button 1914) or decline (button 1912) the request.

Figure 20:
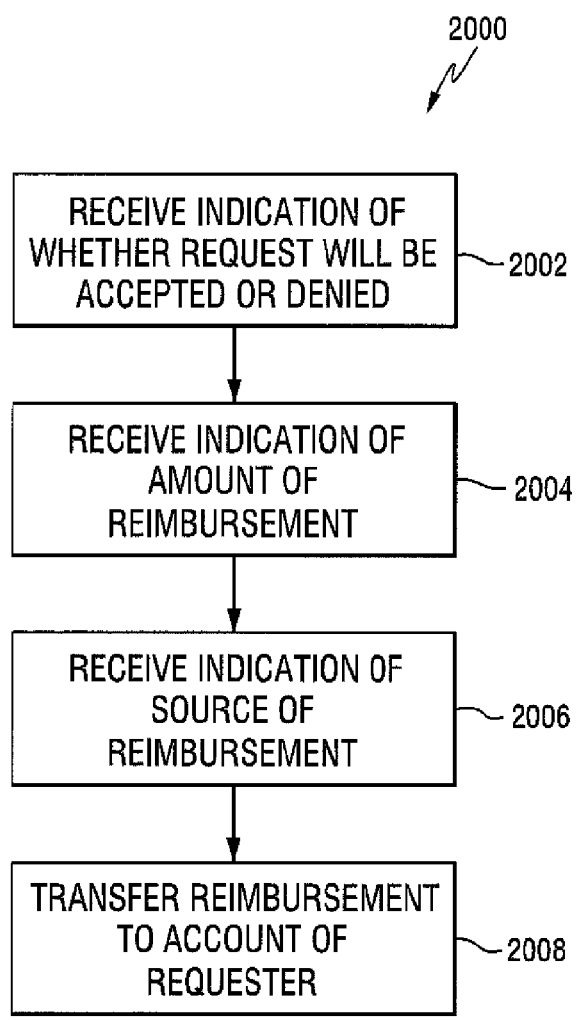
FIG. 20 illustrates one embodiment of a process flow for accepting and responding to a reimbursement request.

FIG. 20 illustrates one embodiment of a process flow 2000 for accepting and responding to a reimbursement request. First, the system 10 (e.g., the application server 30) may receive (2002) an indication from the recipient of whether the reimbursement request will be accepted or denied (e.g., via button 1912 or button 1914). Provided that the reimbursement request is accepted, the system 10 may receive an indication of the reimbursement amount, 2004. FIG. 21 illustrates one embodiment of a user interface 2100 that may be provided to the request recipient to facilitate fulfillment of the request. Like the interface 1900, the interface 2100 may be provided to the recipient, for example, via the Internet UI 45. The reimbursement amount may be entered at field 2102. The recipient may choose to reimburse all or a part of the requested amount. An indication of the source of the reimbursement may be received at field 2103. For example, the recipient may choose to make the reimbursement from a credit account (e.g., a credit card, a line of credit, etc.) or a deposit account (e.g., a checking account, a savings account, an investment account, etc.). Acceptable credit accounts and deposit accounts may be held at the financial institution or another financial institution. Additional information about the payment source may be received at fields 2104. For example, credit card or financial institution account numbers and other information may be received. When all necessary information is received, the system 10 may transfer the accepted reimbursement amount to the account of the first customer, 2008.

As used herein, a "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks (e.g., 20, 70) to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO-.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, computers and computer systems described herein may have the following main components: arithmetic and logic unit (ALU), control unit, memory, and input and output devices (I/O devices). These components can be interconnected by busses, often comprising groups of wires or cables. The control unit, ALU, registers, and basic I/O (and often other hardware closely linked with these sections) can be collectively considered a central processing unit (CPU) for the computer system. The CPU may be constructed on a single integrated circuit or microprocessor.

The control unit (control system or central controller) directs the various components of a computer system. The control system decodes each instruction in a computer program and turns it into a series of control signals that operate other components of the computer system. To enhance performance or efficiency of operation, the control system may alter the order of instructions. One component of the control unit is the program counter, a memory register that tracks the location in memory from which the next instruction is to be read.

The ALU is capable of performing arithmetic and logic operations. The set of arithmetic operations that a particular ALU supports may be limited to adding and subtracting or might include multiplying or dividing, trigonometry functions (sine, cosine, etc.) and square roots. Some may be programmed to operate on whole numbers (integers), while others use floating point to represent real numbers, for example. An ALU may also compare numbers and return Boolean truth values (e.g., true or false). Superscalar computers may contain multiple ALUs to facilitate processing multiple instructions at the same time. For example, graphics processors and computers with SIMD and MIMD features often possess ALUs that can perform arithmetic operations on vectors and matrices. Certain computer systems may include one or more RAM cache memories configured to move more frequently needed data into the cache automatically.

Examples of peripherals that may be used in connection with certain embodiments of the invention include input/output devices such as keyboards, mice, screen displays, monitors, printers, hard disk drives, floppy disk drives, joysticks, and image scanners.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the various servers 25, 30, 35, 60, etc. described herein may be configured and/or programmed to include one or more of the above-described electronic, computer-based elements and components. In addition, these elements and components may be particularly configured to execute the various rules, algorithms, programs, processes, and method steps described herein.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

We claim:

1. A system for generating and delivering a reimbursement request from a customer of a financial institution, the system comprising:
   at least one processor;
   a non-transitory computer readable memory device having instructions thereon that when executed by a processor, cause the processor to perform a method comprising:
   post a plurality of electronic bills to an account of the customer at the financial institution;
   receive information regarding the plurality of electronic bills that are posted to the account of the customer at the financial institution;
   store the information regarding the plurality of electronic bills in a non-transitory computer readable memory device;
   display a transaction list to the customer, wherein the transaction list comprises transactions on the customer's account at the financial institution, wherein each of the transactions indicates a transfer from the customer's account to a third-party payee, wherein the transfer is based on information regarding a corresponding electronic bill;
   receive from the customer an indication of a transaction to be reimbursed, wherein the transaction to be reimbursed is selected from the transaction list;
   receive from the customer an indication of a recipient of the reimbursement request, wherein the recipient of the reimbursement request is not the third-party payee;
   receive from the customer an indication of a reimbursement request amount;
   receive from the customer a text message, the text message being directed to the recipient of the reimbursement request;
   generate the reimbursement request, wherein the generating of the reimbursement request comprises:
   packaging an indication of the customer, a description of the transaction to be reimbursed, the indication of the recipient, and the indication of the reimbursement request amount into a message format; and
   incorporating the text message into the message format upon receipt of the text message from the customer; and
   wherein the reimbursement request comprises the indication of the customer, the description of the transaction to be reimbursed, the indication of the recipient, the indication of the reimbursement request amount, and the text message; and
   transmit the reimbursement request to the recipient; and
   display a reimbursement request list that indicates the status of the transmitted reimbursement request, wherein the reimbursement request list provides an option to cancel the reimbursement request that was transmitted to the recipient.

2. The system of claim 1, wherein displaying the transaction list comprises displaying at least one of the group consisting of transactions that have cleared the customer's account and transactions that are pending on the customer's account.

3. The system of claim 1, wherein the at least one processor is further programmed to:
  receive from the customer an indication of a second transaction to be reimbursed, wherein the second transaction to be reimbursed is selected from the transaction list;
  receive from the customer an indication of a second recipient of a second reimbursement request, wherein the second recipient of the second reimbursement request is not the third-party payee;
  receive from the customer an indication of a second reimbursement request amount;
  receive from the customer a second text message, the second text message being directed to the second recipient of the reimbursement request;
  generate the second reimbursement request, wherein the generating of the second reimbursement request comprises:
    packaging the indication of the customer, a description of the second transaction to be reimbursed, the indication of the second recipient, and the indication of the second reimbursement request amount into a second message format;
    incorporating the second text message into the second message format upon receipt of the second text message from the customer; and
    wherein the second reimbursement request comprises the indication of the customer, the description of the second transaction to be reimbursed, the indication of the second recipient, the indication of the second reimbursement request amount, and the second text message; and
  transmit the second reimbursement request to the second recipient; and
  display the reimbursement request list that indicates the status of the transmitted second reimbursement request, wherein the reimbursement request list provides an option to cancel the second reimbursement request that was transmitted to the second recipient.

4. The system of claim 1, wherein the reimbursement request further comprises a copy of the electronic bill and the amount of the reimbursement request is no greater than the amount of the transaction to be reimbursed.

5. The system of claim 1, wherein the reimbursement request list provides a graphical indication of the status of the reimbursement request and a plurality of additional reimbursement requests made by the customer.

6. The system of claim 1, wherein the at least one processor is further programmed to:
  generate an interface comprising the indication of the customer, the description of the transaction to be reimbursed, the indication of the reimbursement request amount and the text message;
  provide the interface to the recipient;
  receive from the recipient through the interface an indication of whether the reimbursement request will be accepted or denied;
  receive from the recipient through the interface an indication of a reimbursement amount;
  receive from the recipient through the interface an indication of a source of reimbursement, wherein the source of reimbursement is selected from the group consisting of a deposit account of recipient and a credit account of the recipient; and
  transfer the reimbursement amount from the source of reimbursement to an account of the customer.

7. The system of claim 1, wherein the at least one processor is further programmed to:
  generate an interface comprising the indication of the customer, the description of the transaction to be reimbursed, the indication of the reimbursement request amount and the text message;
  provide the interface to the recipient;
  receive from the recipient through the interface an indication of whether the reimbursement request will be accepted or denied;
  receive from the recipient through the interface an indication of a reimbursement amount;
  receive from the recipient through the interface an indication of a source of reimbursement, wherein the source of reimbursement is selected from the group consisting of a deposit account of recipient and a credit account of the recipient; and
  transfer the reimbursement amount from the source of reimbursement to an account of the customer.

8. A computer-implemented method for generating and delivering a reimbursement request from a customer of a financial institution, the method comprising:
  posting, by a computer device, posting a plurality of electronic bills to an account of the customer at the financial institution;
  receiving, by the computer device, receiving information regarding the electronic bills that are posted to the account of the customer at the financial institution;
  displaying by the computer device a transaction list to the customer, wherein the transaction list comprises transactions on the customer's account at the financial institution, wherein each of the transactions indicates a transfer from the customer's account to a third-party payee, wherein the transfer is based on information regarding a corresponding electronic bill, and wherein the computer device comprises at least one processor and operatively associated memory;
  receiving by the computer device from the customer an indication of a transaction to be reimbursed, wherein the transaction to be reimbursed is selected from the transaction list;
  receiving by the computer device from the customer an indication of a recipient of the reimbursement request, wherein the recipient of the reimbursement request is not the third-party payee;
  receiving by the computer device from the customer an indication of a reimbursement request amount;
  receiving by the computer device from the customer a text message, the text message being directed to the recipient of the reimbursement request;
  generating by the computer device a reimbursement request, wherein the generating of the reimbursement request comprises:
  packaging an indication of the customer, a description of the transaction to be reimbursed, the indication of the recipient, and the indication of the reimbursement request amount into a message format; and
  incorporating the text message into the message format upon receipt of the text message from the customer; and
  wherein the reimbursement request comprises the indication of the customer, the description of the transaction to be reimbursed, the indication of the recipient, the indication of a reimbursement request amount, and the text message; and
  transmitting by the computer device the reimbursement request to the recipient; and
  displaying, by the computer device, displaying a reimbursement request list that indicates the status of the transmitted reimbursement request, wherein the reimbursement request list provides an option to cancel the reimbursement request that was transmitted to the recipient.

9. The method of claim 8, wherein displaying the transaction list comprises displaying at least one of the group consisting of transactions that have cleared the customer's account and transactions that are pending on the customer's account.

10. The method of claim 8, further comprising:
receiving from the customer an indication of a second transaction to be reimbursed, wherein the second transaction to be reimbursed is selected from the transaction list;
receiving from the customer an indication of a second recipient of a second reimbursement request, wherein the second recipient of the second reimbursement request is not the third-party payee;
receiving from the customer an indication of a second reimbursement request amount;
receiving from the customer a second text message, the second text message being directed to the second recipient of the reimbursement request;
generating the second reimbursement request, wherein the generating of the second reimbursement request comprises:
packaging the indication of the customer, a description of the second transaction to be reimbursed, the indication of the second recipient, and the indication of the second reimbursement request amount into a second message format;
incorporating the second text message into the second message format upon receipt of the second text message from the customer; and
wherein the second reimbursement request comprises the indication of the customer, the description of the second transaction to be reimbursed, the indication of the second recipient, the indication of the second reimbursement request amount, and the second text message; and
transmitting the second reimbursement request to the second recipient; and
displaying the reimbursement request list that indicates the status of the transmitted second reimbursement request, wherein the reimbursement request list provides an option to cancel the second reimbursement request that was transmitted to the second recipient.

11. The method of claim 8, wherein the reimbursement request further comprises a copy of the electronic bill and the amount of the reimbursement request is no greater than the amount of the transaction to be reimbursed.

12. The method of claim 8, wherein the reimbursement request list provides the customer with a graphical indication of the status of the reimbursement request and a plurality of additional reimbursement requests made by the customer.

13. A system for generating and delivering a reimbursement request from a customer of a financial institution, the system comprising:
a computer device, the computer device posting a plurality of electronic bills to an account of the customer at the financial institution and the computer device receiving information regarding the electronic bills that are posted to the account of the customer at the financial institution;
means for displaying a transaction list to the customer, wherein the transaction list comprises transactions on the customer's account at the financial institution, wherein each of the transactions indicates a transfer from the customer's account to a third-party payee, wherein the transfer is based on information regarding a corresponding electronic bill;
means for receiving from the customer an indication of a transaction to be reimbursed, wherein the transaction to be reimbursed is selected from the transaction list;
means for receiving from the customer an indication of a recipient of the reimbursement request, wherein the recipient of the reimbursement request is not the third-party payee;
means for receiving from the customer an indication of a reimbursement request amount;
means for receiving from the customer a text message, the text message being directed to the recipient of the reimbursement request;
means for generating a reimbursement request, wherein the generating of the reimbursement request comprises:
packaging an indication of the customer, a description of the transaction to be reimbursed, the indication of the recipient, and the indication of the reimbursement request amount into a message format; and
incorporating the text message into the message format upon receipt of the text message from the customer; and
wherein the reimbursement request comprises the indication of the customer, the description of the transaction to be reimbursed, the indication of the recipient, the indication of a reimbursement request amount, and the text message; and
means for transmitting the reimbursement request to the recipient; and
wherein the computer device displays a reimbursement request list that indicates the status of the transmitted reimbursement request; and
wherein the reimbursement request list provides an option to cancel the reimbursement request that was transmitted to the recipient.

14. A system for responding to a reimbursement request from a customer of a financial institution, the system comprising:
at least one processor;
a non-transitory computer readable memory device having instructions thereon that when executed by a processor, cause the processor to perform a method comprising:
generate a reimbursement request, wherein the generating of the reimbursement request comprises:
packaging an indication of the customer, a description of a transaction to be reimbursed, an indication of a recipient of the reimbursement request, and an indication of a reimbursement request amount into a message format,
incorporating a text message into the message format; and
storing the message format in a non-transitory computer readable memory device; and
wherein the reimbursement request comprises the indication of the customer, the description of the transaction to be reimbursed, the indication of the recipient, the indication of a reimbursement request amount, and the text message; and
wherein the transaction to be reimbursed is drawn on an account of the customer and payable to a third-party payee, and wherein the recipient of the reimbursement request is not the third-party payee; and
transmit the reimbursement request to the recipient;
generate an interface comprising the indication of the customer, the description of the transaction to be reimbursed, the indication of the reimbursement request amount and the text message;
provide the interface to the recipient;

receive from the recipient through the interface an indication of whether the reimbursement request will be accepted or denied;
receive from the recipient through the interface an indication of a reimbursement amount;
receive from the recipient through the interface an indication of a source of reimbursement, wherein the source of reimbursement is selected from the group consisting of a deposit account of recipient and a credit account of the recipient; and
transfer the reimbursement amount from the source of reimbursement to an account of the customer.

15. The system of claim 14, wherein the reimbursement amount is not equal to the reimbursement request amount.

16. The system of claim 14 wherein the deposit account is held at the financial institution and wherein the customer account is also held at the financial institution.

17. A computer-implemented method for responding to a reimbursement request from a customer of a financial institution, the method comprising:
generating a reimbursement request by a computer device, wherein the generating of the reimbursement request comprises:
packaging an indication of the customer, a description of a transaction to be reimbursed, an indication of a recipient of the reimbursement request, and an indication of a reimbursement request into a message format,
incorporating a text message into the message format; and
wherein the reimbursement request comprises the indication of the customer, the description of the transaction to be reimbursed, the indication of the recipient, the indication of a reimbursement request amount, and the text message; and
wherein the transaction to be reimbursed is drawn on an account of the customer and payable to a third-party payee, wherein the recipient of the reimbursement request is not the third-party payee, and wherein the computer device comprises at least one processor and operatively associated memory;
transmitting the reimbursement request by the computer device to the recipient;
generating an interface comprising the indication of the customer, the description of the transaction to be reimbursed, the indication of the reimbursement request amount and the text message;
providing the interface by the computer device to the recipient;
receiving from the recipient by the computer device through the interface an indication of whether the reimbursement request will be accepted or denied;
receiving from the recipient by the computer device through the interface an indication of a reimbursement amount;
receiving from the recipient by the computer device through the interface an indication of a source of reimbursement, wherein the source of reimbursement is selected from the group consisting of a deposit account of recipient and a credit account of the recipient; and
transferring the reimbursement amount by the computer device from the source of reimbursement to an account of the customer.

18. The method of claim 17, wherein the reimbursement amount is not equal to the reimbursement request amount.

19. The method of claim 17, wherein the deposit account is held at the financial institution and wherein the customer account is also held at the financial institution.

20. A system for responding to a reimbursement request from a customer of a financial institution, the system comprising:
at least one processor;
a non-transitory computer readable memory device having instructions thereon that when executed by a processor, cause the processor to perform a method comprising:
generating a reimbursement request, wherein the generating of the reimbursement request comprises:
packaging an indication of the customer, a description of the transaction to be reimbursed, an indication of the recipient of the reimbursement request, and an indication of a reimbursement request amount into a message format;
incorporating a text message into the message format; and
storing the message format in a non-transitory computer readable memory device; and
wherein the reimbursement request comprises the indication of the customer, the description of the transaction to be reimbursed, the indication of the recipient, the indication of a reimbursement request amount, and the text message; and
wherein the transaction to be reimbursed is drawn on an account of the customer and payable to a third-party payee, and wherein the recipient of the reimbursement request is not the third-party payee;
transmit the reimbursement request to the recipient;
generate an interface comprising the indication of the customer, the description of the transaction to be reimbursed, the indication of the reimbursement request amount and the text message;
provide the interface to the recipient;
receive from the recipient through the interface an indication of whether the reimbursement request will be accepted or denied;
receive from the recipient through the interface an indication of a reimbursement amount;
receive from the recipient through the interface an indication of a source of reimbursement, wherein the source of reimbursement is selected from the group consisting of a deposit account of recipient and a credit account of the recipient; and
transfer the reimbursement amount from the source of reimbursement to an account of the customer.

* * * * *